(12) United States Patent
Kogure et al.

(10) Patent No.: US 7,653,211 B2
(45) Date of Patent: Jan. 26, 2010

(54) DIGITAL WATERMARK EMBEDDING APPARATUS AND DIGITAL WATERMARK DETECTION APPARATUS

(75) Inventors: Nakaba Kogure, Zama (JP); Tomoo Yamakage, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 790 days.

(21) Appl. No.: 11/357,427

(22) Filed: Feb. 21, 2006

(65) Prior Publication Data

US 2006/0204031 A1 Sep. 14, 2006

(30) Foreign Application Priority Data

Feb. 21, 2005 (JP) ............................. 2005-044277

(51) Int. Cl.
*H04K 1/00* (2006.01)
(52) U.S. Cl. ........................................ 382/100
(58) Field of Classification Search ................ 382/100, 382/232, 248; 713/176; 380/287, 54
See application file for complete search history.

(56) References Cited

U.S. PATENT DOCUMENTS

| | | | |
|---|---|---|---|
| 5,825,879 A | 10/1998 | Davis | 380/5 |
| 5,930,369 A | 7/1999 | Cox et al. | 380/54 |
| 5,940,135 A | 8/1999 | Petrovic et al. | 348/473 |
| 6,064,739 A | 5/2000 | Davis | 380/200 |
| 6,145,081 A | 11/2000 | Winograd et al. | 713/200 |
| 6,148,400 A | 11/2000 | Arnold | 713/168 |
| 6,175,627 B1 | 1/2001 | Petrovic et al. | 380/42 |
| 6,415,041 B1 | 7/2002 | Oami et al. | 382/100 |
| 6,469,743 B1 | 10/2002 | Cheney et al. | 348/553 |
| 6,741,723 B2 | 5/2004 | Yamakage et al. | 382/100 |
| 6,901,515 B1 | 5/2005 | Muratani | 713/176 |
| 6,952,486 B2 | 10/2005 | Yamakage et al. | 382/100 |
| 6,996,250 B2 | 2/2006 | Nakamura et al. | 382/100 |
| 7,123,744 B2 | 10/2006 | Muratani et al. | 382/100 |
| 7,130,443 B1 | 10/2006 | Werner et al. | 382/100 |
| 7,284,129 B2 | 10/2007 | Pelly et al. | 713/176 |
| 7,284,130 B2 | 10/2007 | Asano et al. | 713/176 |
| 7,302,573 B2 | 11/2007 | Kogure et al. | 713/175 |
| 7,471,807 B2 | 12/2008 | Asano et al. | 382/100 |

(Continued)

FOREIGN PATENT DOCUMENTS

EP 0 923 027 A2 6/1999

(Continued)

OTHER PUBLICATIONS

Loo et al., "Digital Watermarking Using Complex Wavelets," IEEE Proc. Int'l Conf. on Image Processing, vol. 3, pp. 29-32, Sep. 2000.*

(Continued)

*Primary Examiner*—Andrew W Johns
(74) *Attorney, Agent, or Firm*—Nixon & Vanderhye, PC

(57) ABSTRACT

A digital watermark embedding apparatus includes a scaling unit configured to scale at least a specific frequency component of an input image signal to generate a scaled image signal, a control unit configured to control at least one of a phase and amplitude of the scaled image signal in accordance with watermark information to generate a controlled image signal, and a combiner to combine the input image signal and the controlled image signal to generate an output image signal embedded with the watermark information.

11 Claims, 17 Drawing Sheets

U.S. PATENT DOCUMENTS

| | | | |
|---|---|---|---|
| 7,515,731 B2 | 4/2009 | Koto et al. | 382/100 |
| 2003/0091213 A1 | 5/2003 | Yamakage et al. | 382/100 |
| 2003/0108219 A1 | 6/2003 | Muratani et al. | 382/100 |
| 2004/0117629 A1 | 6/2004 | Koto et al. | 713/176 |
| 2004/0136531 A1 | 7/2004 | Asano et al. | 380/202 |
| 2004/0194126 A1 | 9/2004 | Kogure et al. | 725/31 |
| 2005/0053259 A1 | 3/2005 | Asano et al. | 382/100 |
| 2005/0094848 A1 | 5/2005 | Carr et al. | 382/100 |
| 2006/0204031 A1 | 9/2006 | Kogure et al. | 382/100 |
| 2007/0195988 A1 | 8/2007 | Kogure et al. | 382/100 |
| 2007/0217606 A1 | 9/2007 | Asano et al. | 380/202 |

FOREIGN PATENT DOCUMENTS

| | | |
|---|---|---|
| EP | 1 001 368 A2 | 5/2000 |
| EP | 1 220 152 A2 | 7/2002 |
| JP | 60-68703 A | 4/1985 |
| JP | 11-346302 A | 12/1999 |
| JP | 2000-165654 A | 6/2000 |
| JP | 2000-236432 A | 8/2000 |
| JP | 2001-16438 A | 1/2001 |
| JP | 2001-16538 A | 1/2001 |
| JP | 2001-218044 A | 8/2001 |
| JP | 2001-224029 A | 8/2001 |
| JP | 2001-518651 A | 10/2001 |
| JP | 2001-527660 A | 12/2001 |
| JP | 2002-77589 A | 3/2002 |
| JP | 2002-185762 A | 6/2002 |
| JP | 2002-191033 A | 7/2002 |
| JP | 2002-519916 A | 7/2002 |
| JP | 2002-325233 A | 11/2002 |
| JP | 2004-64319 A | 2/2004 |
| WO | WO 99/18723 A1 | 4/1999 |
| WO | WO 01/24113 A1 | 4/2001 |

OTHER PUBLICATIONS

Earl et al., "Spread Spectrum Watermarking for Video Sources," IEEE Proc. Int'l Conf. on Image Processing, vol. 2, pp. 491-494, Sep. 2003.*

Zhang et al., "A novel transform-domain image watermark," Can. J. Elect. Comput. Eng., vol. 29, No. 3, pp. 179-182, Jul. 2004.*

U.S. Appl. No. 10/626,610.

U.S. Appl. No. 10/808,279.

U.S. Appl. No. 10/649,930.

U.S. Appl. No. 10/775,235.

Bijan G. Mobasseri, et al. "Direct Sequence Watermarking of Digital Video Using m- frames", IEEE, Comput. Soc., XP010308533, vol. 2, Oct. 4, 1998, pp. 399-403. (Abstract).

Tae-Yun Chung et al., "Digital Watermarking for Copyright Protection of MPEG2 Compressed Video", IEEE Transactions on Consumer Electronics, XP011008532, vol. 44, No. 3, Aug. 1998, pp. 895-901. (Abstract).

Husrev T. Sencar et al., "A Robust Type-III Data Hiding Technique Against Cropping & Resizing Attacks", IEEE International Symposium on Circuits and Systems, XP002398738, vo., 2, May 26, 2002, pp. II-444-II-447.

J.J.K. O'Ruanaidh et al., "Phase Watermarking of Digital Images", Proceedings of the International Conference on Image Processing (ICIP), XP010202375, vol. 1, Sep. 16, 1996, pp. 239-242.

Saraju P. Mohanty, "Digital Watermarking: A Tutorial Review", (Online) Retrieved from Internet, XP-002386431, 1999, pp. 1-24.

Mitchell D. Swanson et al., Transparent Robust Image Processing (ICIP) Lausanne, vol. 1, XP010202368, Sep. 16, 1996, pp. 211-214.

Alejandro Loboguerrero et al., "Implementation d'un systeme' de Tatouage Pour la Transmission de Donees", XXIVe'mes Journess d' Etrude sur la Parole, Nancy, XP-002386432, Jun. 24, 2002.

Raymond B. Wolfgang et al., "Perceptual Watermarks for Digital Images and Video", Proceedings of the IEEE, vol. 87 No. 7, XP-011044240, Jul. 1999, pp. 1108-1126. (Abstract).

Damien Delannay et al., "Compensation of Geometrical Deformations for Watermark Extraction in the Digital Cinema Application",, Proceedings of the SPIE, vol. 4314, XP-002960804, Jan. 22, 2001, pp. 149-157. (Abstract).

Jeffrey A. Bloom, et al. "Copy Protection for DVD Video", Proceedings of the IEEE, vol. 87, No. 7, XP-011044224, Jul. 1999, pp. 1267-1276.

Frank Hartung et al., "Digital Watermarking of MPEG-2 Coded Video in the Bitstream Domain", 1997 IEEE, XP-010225693, vol. 4, Apr. 21, 1997, pp. 2621-2624.

R. Lancini et al. A Robust Video Watermarking Technique in the International Symposium on Video/Image Processing and Multimedia Communications, XP-010598723, Jun. 16-19, 2002, pp. 251-256. (Abstract).

\* cited by examiner

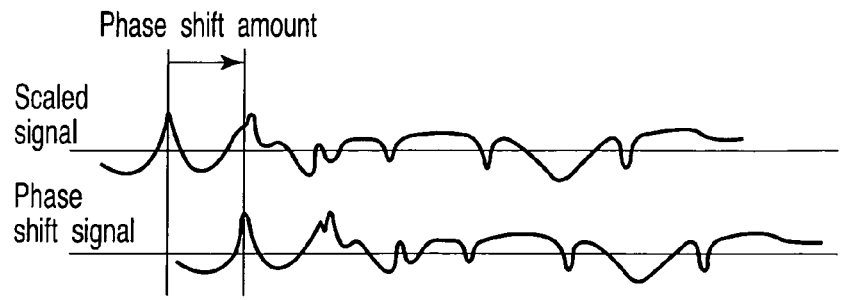
FIG. 3A Scaled signal
FIG. 3B Phase shift signal
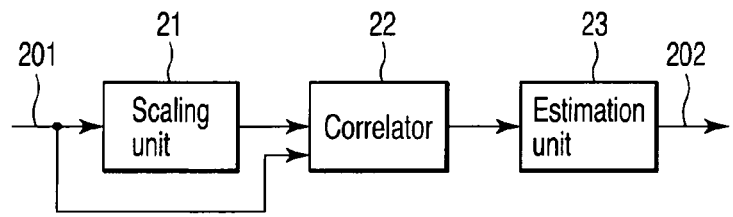
FIG. 4
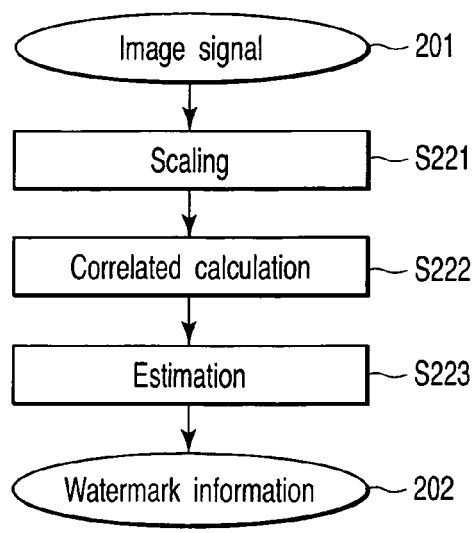
FIG. 5

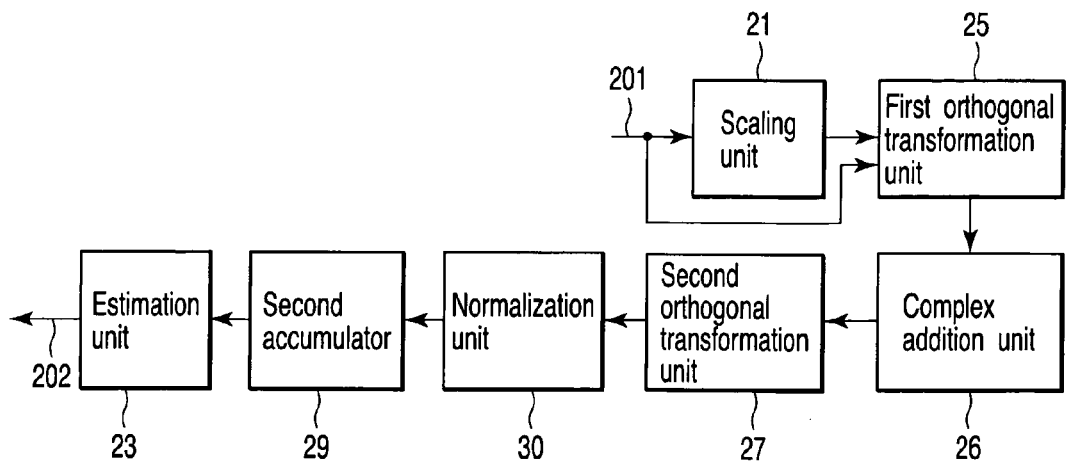

DIGITAL WATERMARK EMBEDDING APPARATUS AND DIGITAL WATERMARK DETECTION APPARATUS

CROSS-REFERENCE TO RELATED APPLICATIONS

This application is based upon and claims the benefit of priority from prior Japanese Patent Application No. 2005-044277, filed Feb. 21, 2005, the entire contents of which are incorporated herein by reference.

BACKGROUND OF THE INVENTION

1. Field of the Invention

The present invention relates to a digital watermark embedding apparatus and a digital watermark detection apparatus useful in preventing illegal copies of a digital video signal provided via, for example, a recording medium.

2. Description of the Related Art

As apparatuses for recording and playing back digital image data such as a digital VTR, DVD (Digital Versatile Disk), and the like have prevailed, a number of digital moving images that can be played back by these apparatuses are provided. Various digital moving images are distributed via digital television broadcast via the Internet, broadcast satellite, communication satellite, and the like, enabling users to enjoy high-quality digital moving images.

It is easy to make high-quality copies from digital moving images on the digital signal level. Therefore, if some copy protection or copy control is not applied to digital moving images, there is the danger of unrestricted formation of copies of digital images. Therefore, illicit copying of digital images must be prevented, and the number of generations of copies formed by a valid user must be restricted. For this purpose, a method of appending information for copy control to each digital moving image, and preventing illicit copying or restricting copies has been proposed.

As a technique for superposing additional information to a digital moving image in such a way, digital watermarking is known. In digital watermarking, information such as identification information of the copyright owner or user of contents, right information of the copyright owner, use conditions of contents, secret information required upon using contents, the aforementioned copy control information, or the like (such information will be referred to as watermark information hereinafter) is embedded in contents of audio data, music data, moving image data, still image data, or the like, which has been converted into digital data, so as not to be easy to perceive. By detecting the embedded watermark information from the contents later as needed, copyright protection, including use control and copy control, can be achieved, and further use of the contents is possible.

As a conventional method of digital watermarking, a method that applies a spread spectrum technique is known. In this method, watermark information is embedded in a digital moving image in the following sequence.

In step E1, an image signal undergoes spread spectrum by being multiplied by a PN (Pseudorandom Noise) sequence.

In step E2, the image signal after spread spectrum is subjected to frequency transformation.

In step E3, watermark information is embedded in the image signal by changing the values of specific frequency components.

In step E4, the image signal is subjected to inverse frequency transformation (e.g., IDCT).

In step E5, the image signal is subjected to inversely spread spectrum (the image signal is multiplied by the same PN sequence as in step E1).

Watermark information is detected in the following sequence, from the digital moving image, in which the watermark information has been embedded in the above sequence.

In step D1, the image signal is subjected to spread spectrum by being multiplied by a PN (Pseudorandom Noise) sequence (the same PN sequence as in step E1).

In step D2, the image signal after spread spectrum is subjected to frequency transformation (e.g., DCT).

In step D3, the embedded watermark information is extracted from the image signal while paying attention to the values of specific frequency components.

Meanwhile, the following techniques are described in Jpn. Pat. KOKAI Publication No. 2002-325233 (claim 2 and FIG. 7) and Jpn. Pat. KOKAI Publication No. 2004-64319 (claim 1 and FIG. 1). A specific frequency component signal extracted from an input image signal is subjected to amplitude control or phase control according to watermark information. Such a specific frequency component signal is then superimposed on the input image signal whereby watermark information is embedded therein. Meanwhile, when detecting the watermark information, this specific frequency component signal extracted form the input image signal is subjected to the amplitude control or phase control, whereby a correlation value between the input image signal and specific frequency component signal is computed to detect the watermark information.

When digital watermarking is applied to digital productions for the purpose of prevention of illicit use, a characteristic (robustness) that can prevent watermark information from being lost or tampered with, and deliberate attacks which are normally carried out on digital productions must be provided to digital watermarking. As attacks that make the watermark information of a digital image impossible to detect, cut-out, scaling (enlargement/reduction), rotation, and the like of an image are known.

When an image that has suffered such attacks is input, the conventional technique recovers synchronization of a PN sequence by executing a process for estimating a PN sequence used in step E1 at the time of embedding upon detection of watermark information. After that, the processes in steps D1 to D3 are executed to extract the embedded watermark information. However, in order to recover synchronization of the PN sequence from the image signal alone, a search must be conducted by trying a process for detecting watermark information using a plurality of candidates of PN sequences and adopting a candidate that can be detected satisfactory. For this purpose, problems of increases in arithmetic operation volume and circuit scale are posed.

Further, since watermark embedded in an image signal under an attack of scaling or rotation is weakened, it is very possible that the watermark cannot be detected even if the contents (scaling, rotation, etc.) of the attack is detected and a detection method corresponding to the attack is utilized.

BRIEF SUMMARY OF THE INVENTION

It is an object of the present invention to provide a digital watermark embedding apparatus, and a digital watermark detection apparatus, to embed and detect watermark information using phase control and amplitude control of an input image signal, particularly to embed and detect watermark information that is weakened under the attack such as scaling or rotation accurately.

An aspect of the present invention provides a digital watermark embedding apparatus for embedding watermark information in an input image signal, the apparatus comprising: a scaling unit configured to scale at least a specific frequency component of an input image signal to generate a scaled image signal; a control unit configured to control at least one of a phase and amplitude of the scaled image signal in accordance with watermark information to generate a controlled image signal; and a combiner to combine the input image signal and the controlled image signal to generate an output image signal embedded with the watermark information.

BRIEF DESCRIPTION OF THE SEVERAL VIEWS OF THE DRAWING

FIGS. 3A and 3B illustrate a phase shift carried out in a phase and amplitude controller of the first embodiment.

FIG. 4 is a block diagram of a digital watermark detection apparatus according to a second embodiment of the present invention.

FIG. 5 is a flow chart showing a digital watermark detection sequence of the second embodiment.

FIG. 19 illustrates a first example of an accumulation pattern obtained by a second accumulator of the seventh embodiment.

FIG. 20 illustrates a second example of an accumulation pattern obtained by a second accumulator of the seventh embodiment.

FIG. 21 illustrates a third example of an accumulation pattern obtained by a second accumulator of the seventh embodiment.

FIG. 22 is a block diagram of a digital watermark detection apparatus according to an eighth embodiment of the present invention.

DETAILED DESCRIPTION OF THE INVENTION

Embodiments of the invention will be described in detail with reference to the accompanying drawings.

First Embodiment

Figure 1:
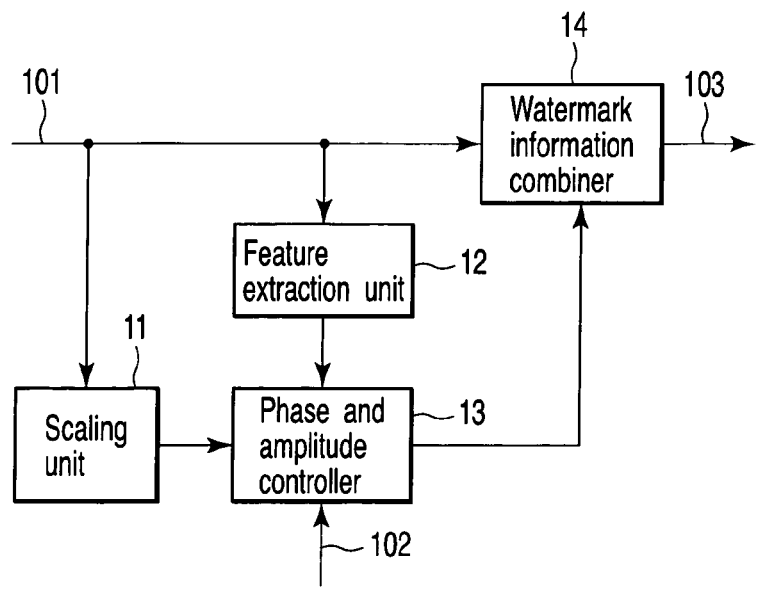
FIG. 1 is a block diagram of a digital watermark embedding apparatus according to a first embodiment of the present invention.

FIG. 1 illustrates a digital embedding apparatus according to the first embodiment of the present invention. In FIG. 1, an input image signal (video signal) 101 to be embedded with watermark information such as a digitized motion image or a still image, is input to the apparatus. The input image signal 101 may include both a luminance signal and a color difference signal, or only a luminance signal. The input image signal 101 is input to a scaling unit 11, a feature extraction unit 12 and a water mark information combiner 14.

The scaling unit 11 is, for example, a digital filter of a frequency domain, which carries out scaling (an enlargement or reduction process) in a particular scaling rate on the input image signal 101. An image signal generated by the scaling unit 11 will be referred to as a scaled image signal hereinafter. The scaled image signal generated by the scaling unit 11 is input to the signal input terminal of a phase and amplitude controller 13.

Meanwhile, watermark information 102, which is digital information to be embedded in the input image signal 101, is supplied to a control input terminal of the phase and amplitude controller 13. The phase and amplitude controller 13 generates a controlled image signal by subjecting the scaled image signal received from the enlargement/reduction unit 11 to phase control and amplitude control predetermined in accordance with the watermark information 102 to. For example, if the watermark information 102 is "0", the phase and amplitude controller 12 does not carry out phase control and amplitude control, and if the watermark information 102 is "1", it carries out the phase control with a predetermined specific control quantity and an amplitude control with a predetermined specific control quantity. Here, although it is explained as carrying out both the phase and amplitude controls, it is also possible to carry out only either one control.

The feature extraction unit 12 extracts a feature of the input image signal 101, such as an activity of an image. The information indicating the extracted feature is input to the phase and amplitude controller 13, which controls the phase control quantity and amplitude control quantity to be given to the scaled image signal according to the extracted feature quantity. In particular, if the feature quantity is activity, the controlling coefficient for phase control and amplitude control carried out by the phase and amplitude controller 13 is increased as the activity increases. Further, the feature extraction unit 12 is optional, therefore, can be omitted.

The controlled image signal generated by the phase and amplitude controller 13 is provided to the watermark information combiner 14 as an embedding signal, which is combined with the input image signal 101. The phase and amplitude controller 13 is implemented by, for example, a digital adder.

The scaled image signal generated by the scaling unit 11 in this manner is subjected to the phase control and amplitude control peculiar to the watermark embedding apparatus by the phase and amplitude controller 13. On such occasion, at least either one of the phase control quantity and the amplitude quantity is determined by the watermark information 102. Accordingly, the watermark information 102 is in effect embedded in the input image signal 101 by the water mark information combiner 14. Further, the embedded signal can also be controlled by the phase and amplitude controller 13 according to the activity of the scaled image signal.

The scaling unit 11 and the phase and amplitude controller 13 may generate a scaled image signal and controlled image signal for a plurality of channels, respectively. In such a case, embedding signals for a plurality of channels will be combined with the input image signal 101 by the water mark information combiner 14. Alternatively, by providing a watermark detection function to the digital watermark embedding apparatus, a method of controlling intensity of the embedding signal according to the signal intensity of the detected watermark information can also be considered. Further, by providing a function to detect image quality degradation after digital watermark embedding to the digital watermark embedding apparatus, a method of controlling intensity of the embedding signal according to the detected image quality degradation can also be considered.

The thus-obtained image signal 103 embedded with watermark information 102 (hereinafter referred to as embedded image signal) is recorded on a recording medium by, for example, a digital image recording/reproducing apparatus, such as a DVD system, or transmitted via a transmission medium, such as the Internet, a broadcasting satellite, a communication satellite.

Next, a digital watermark embedding sequence according to the present embodiment will be explained by using the flow chart of FIG. 2.

First, the input image signal 101 to be embedded with a watermark information 102 is subjected to a scaling process and feature extraction by the scaling unit 11 and feature extraction unit 12 (steps S111 and S112). In step S111, a scaled image signal is generated by subjecting the input image signal 101 to a scaling process at a certain scaling rate, such as a reduction process in 0.5 magnifications. In step S112, a feature of the input image signal 101, such as an activity of the image, is extracted.

The scaled image signal generated in step S111 is subjected to at least either one control of a phase control of a specific phase control quantity, an amplitude control of a specific amplitude control quantity, predetermined by the phase and amplitude controller 13, is subjected to (step S113). In particular, the phase control is carried out by a single or plural digital phase shifter, and the phase control quantity is a phase shift quantity of the phase shifter. FIGS. 3A and 3B illustrate an aspect of a phase shift, which, in this example, is simply carried out as illustrated in FIG. 3B by maintaining the wave pattern of a scaled image signal illustrated in FIG. 3A. In particular, the amplitude control is carried out by a single or plural exclusive circuit or a digital multiplier. In such case, the amplitude control quantity is a control coefficient by which the input scaled image signal is multiplied.

In step S113, the phase control quantity and amplitude control quantity of the scaled image signal are controlled according to the feature quantity input in step S111. Specifically, if the feature quantity is an activity, the control coefficient is increased as the activity increases. Further, the phase control quantity and amplitude control quantity are controlled in accordance with the watermark information 102, which is the digital information to be embedded in the input image signal 101.

The image signal subjected to the phase control and amplitude control in step S114 is combined with the input image signal 101 as an embedded signal by the water mark information combiner 14. In such way the watermark information 102 is embedded in the input image signal 101, whereby an embedded image signal 103 is generated (step S114). The generated embedded image signal 103 is either recorded or transmitted.

Next, further to the watermark information 102 embedded by the digital watermark embedding apparatus of the first embodiment, several embodiments of a digital watermark detection apparatus to detect the watermark information 102 from the embedded image signal 103, which is recorded on a recording medium by, for example, a digital image recording/reproducing apparatus, such as a DVD system, or transmitted via a transmission medium, such as the Internet, a broadcasting satellite, a communication satellite is explained.

Second Embodiment

FIG. 4 illustrates a digital watermark detection apparatus according to the second embodiment of the present invention. The embedded image signal 103 generated by the digital watermark embedding apparatus shown in FIG. 1 is provided to the digital watermark detection apparatus in FIG. 4 via a recording medium or a transmission medium as an input image signal 201. The input image signal 201 is first subjected to scaling (enlargement or reduction process) by a scaling unit 21, which carries out the enlargement or reduction process at the same scaling rate used by the scaling unit 11 of the digital watermark embedding apparatus in FIG. 1 to generate a scaled image signal.

The input image signal 201 and the scaled image signal generated by the scaling unit 21 are input to a correlator 22, which generates a correlated calculation signal by carrying out correlated calculation, such as a cross-correlation and phase only correlation (POC). Here, if the scaling and correlated calculation are linear processing, it is possible to switch the order of alignment of the scaling unit 21 and the correlator 22, thereby arranging the scaling unit 21 after the correlator 22. The correlated calculation signal is input to the estimation unit 23, which estimates the watermark information embedded in the input image signal 201 to output a watermark information detection signal 202. The process of the estimation unit 23 will be explained later in detail.

Next, the digital watermark detection sequence according to a present embodiment will be explained by using the flow chart shown in FIG. 5.

The input image signal 201, which is an embedded image signal input via a recording medium or a transmission medium, is first subjected to enlargement or reduction process by the scaling unit 21 to generate a scaled image signal (step S221).

Then, by applying correlated calculation, such as a cross-correlation, autocorrelation or a phase only correlation, on the scaled image signal through the correlator 22, a correlated calculation signal is generated (step 222). Phase only correlation will be explained later in detail.

Next, a watermark information detection signal 202 is obtained by estimating the watermark information from the correlated calculation signal with the estimation unit 23 (step 223). If the scaling process and correlated calculation process are linear processing, the order of alignment of the scaling step 221 and the correlated calculation step 222 can be switched.

Figure 6:
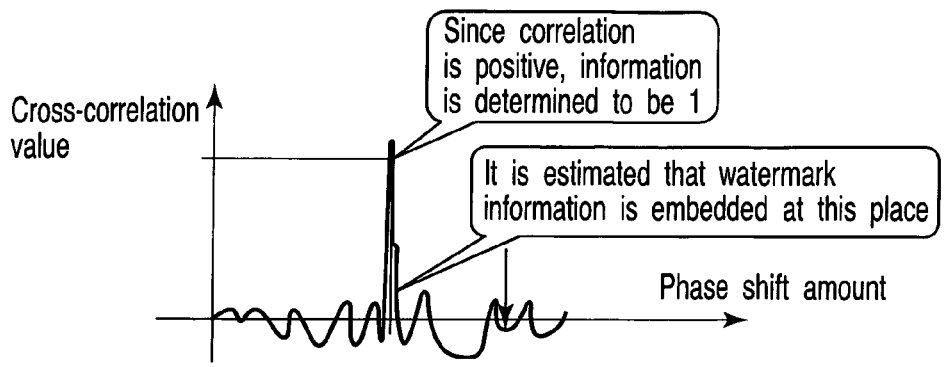
FIG. 6 illustrates a peak search of correlation value and watermark information detection example of the second embodiment.

Next, the watermark information estimation method carried out by the estimation unit 23 in step S223 is explained with reference to FIG. 6. A digital signal "1" or "0" is embedded in the input image signal 201 as watermark information.

First, a correlation value (cross-correlation value) between an original correlative calculation signal failed to be subjected to a phase shift and a correlative calculation signal is obtained while subjecting the correlative calculation signal to the phase shift as shown in FIGS. 3A and 3B. FIG. 6 illustrates the relation between the correlation value and the phase shift amount. When observing the transition of the correlation value illustrated in FIG. 6, a peak appears at a certain position of the phase shift quantity, thereby indicating that the polar character of this peak is the watermark information. In other words, when the input image signal 201 is subjected to a scaling attack, the value of the phase shift quantity possessed by the scaled image signal differs from the value of the phase shift quantity provided to the scaled image signal by the digital watermark embedding apparatus. Further, owing to the scaling attack, in some cases, the origin of the peak is shifted causing the entire peak position to shift evenly. Therefore, in the present embodiment, the watermark information is estimated by searching for the peak of the correlation value between the correlative calculation signal before carrying out phase shift and the correlative calculation signal output from the correlator 22 while carrying out phase shift, whereby a watermark information detection signal 202 is output.

More specifically, by controlling the origin of the phase shift and the phase shift quantity continuously or in step-by-step with the estimation unit 23 and searching for the peak of the correlation value generated thereby, the watermark information is estimated from the polar character of the searched peak. The peak of the correlation value takes a value of either positive or negative according to the watermark information embedded in the input image signal 201. In the case of FIG. 6, for example, if it is positive, the watermark information is determined as "1", and if it is negative, the watermark information is determined as "0". Further, for example, by calculating the pitch of the peak of correlation value by an orthogonal transformation such as a fast Fourier transformation (FFT), a method of calculating a desired phase shift quantity from the calculated pitch can also be considered. Thus, watermark information 201 can be detected by the estimation unit 23 from an image subjected to the scaling attack.

Meanwhile, watermark information can also be estimated from an accumulated signal obtained by accumulating the scaled image signal for a certain period with an accumulator inserted between the correlator 22 and the estimation unit 23.

In this manner, according to the present embodiment, by accumulating the input image and embedded signal (watermark information) separated by controlling the digital watermark embedding apparatus and the digital watermark detection apparatus accordingly, a robust correlation result for the input image signal 201 is calculated. Thus, a robust and high digital watermark detection rate can be brought about on the input image signal 201.

Third Embodiment

Figure 7:
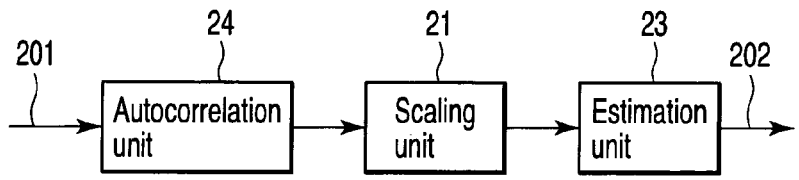
FIG. 7 is a block diagram of a digital watermark detection apparatus according to a third embodiment of the present invention.

In a digital watermark detection apparatus according to the third embodiment of the present invention illustrated in FIG. 7, an embedded image signal 103 generated by the digital watermark embedding apparatus in FIG. 1 is provided via a recording medium or a transmission medium as an input image signal 201. The input digital signal 201 is input to an autocorrelation unit 24, which carries out autocorrelation calculation to generate an autocorrelation calculation signal. The autocorrelation calculation signal is subjected to enlargement or reduction process by the scaling unit 21.

The scaling unit 21 generates a scaled image signal by carrying out enlargement or reduction process at the same scaling rate as that of the scaling unit 11 used in the digital watermark embedding apparatus in FIG. 1. If the scaling process and the autocorrelation calculation process are a linear process, it is possible to switch the order of alignment between the scaling unit 21 and the autocorrelation unit 24 so that the scaling unit 21 is arranged after the autocorrelation unit 24. The scaled image signal is input to the estimation unit 23, and the watermark information 201 is detected by estimating the embedded watermark information. The explanation of the process carried out by the estimation unit 23 will be omitted as it is equivalent to the second embodiment.

Figure 8:
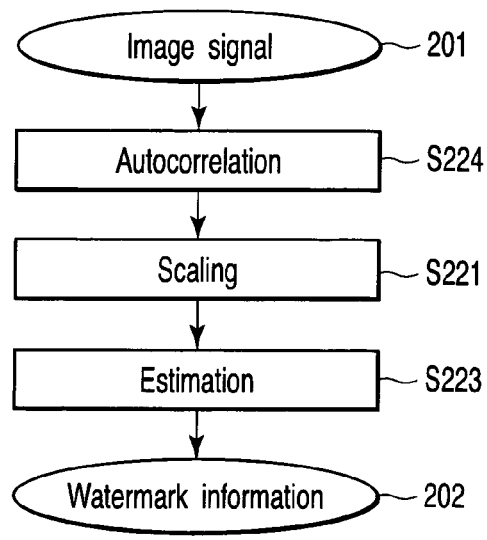
FIG. 8 is a flow chart showing a digital watermark detection sequence of the third embodiment.

Next, the digital watermark detection sequence according to the present embodiment will be explained by using the flow chart shown in FIG. 8.

Firstly, the input image signal 201, which is an embedded image signal input via a recording medium or transmission medium is subjected to an autocorrelation calculation by the autocorrelation unit 24, whereby the autocorrelation calculation signal is generated (step S224). Secondly, the autocorrelation calculation signal is subjected to an enlargement or reduction process by the scaling unit 21, whereby a scaled image signal is generated (step S221). Lastly, watermark information is estimated from the scaled image signal by the estimation unit 23 (step S223). If the autocorrelation calculation process and the scaling process are linear processes, it is possible to switch the order of alignment between the autocorrelation calculation step S224 and the scaling step S221. Obviously, the present embodiment will achieve equivalent results as the second embodiment.

By inserting an accumulator between the scaling unit 21 and the estimation unit 23, it is also possible to estimate the water information from an accumulated signal obtained by accumulating the scaled image signal for a certain period of time.

Fourth Embodiment

Figure 9:
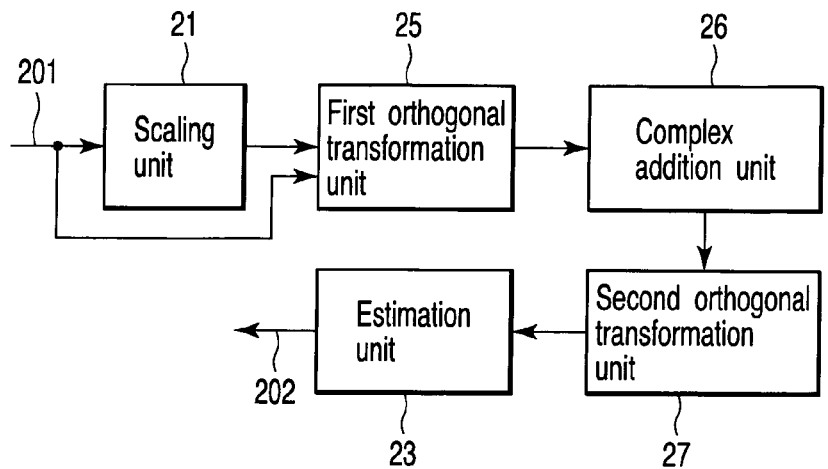
FIG. 9 is a block diagram of a digital watermark detection apparatus according to a fourth embodiment of the present invention.

A digital watermark detection apparatus according to a fourth embodiment of the present invention illustrated in FIG. 9 is provided with an embedded image signal 103, which is generated by the digital watermark embedded apparatus in FIG. 1, as an input image signal 201 via a recording medium or a transmission medium. A digital signal "1" or "0" is embedded in the input image signal 201 as watermark information. First, scaling, i.e., enlargement or reduction process, is carried out on the input image signal 201 by the scaling unit 21. The scaling unit 21 generates a scaled image signal by carrying out enlargement or reduction process at the same scaling rate as the scaling unit 11 used in the digital watermark embedding apparatus in FIG. 1.

The input image signal 201 and the scaled image signal generated by the scaling unit 21 are input to a first orthogonal transformation unit 25, and subjected to a first orthogonal transformation such as FFT to produce orthogonal transformation image signals of the scaled image signal and the input image signal 201. The orthogonal transformation image signals of the scaled image signal and the input image signal 201 are input to a complex addition unit 26 to be subjected to complex addition. The result signal obtained by the complex addition is subjected to a second orthogonal transformation by a second orthogonal transformation unit 27.

In addition, an amplitude compressor may be provided on the output stage of the complex addition unit 26 to subject the signal obtained by the complex addition to an amplitude compression process and then to the second orthogonal transformation by the second orthogonal transformation unit 27. A method of fixing the amplitude to 1 and using an exponential logarithmic value of the amplitude is conceivable as the amplitude compression method.

The signal obtained by the second orthogonal transformation is supplied to an estimation unit 23. The estimation unit 23 obtains a correlation value (cross-correlation value) between the original signal failed to undergo a phase shift, and the signal subjected to the second orthogonal transformation while subjecting the second-orthogonal-transformed signal to the phase shift as shown in FIGS. 3A and 3B, like the second embodiment, and estimates watermark information from the correlation value to output a watermark information detection signal 202. In other words, when observing the transition of the correlation value, a peak appears at a certain position of the phase shift quantity. The polarity of this peak indicates the watermark information. Further, a method of calculating a pitch of the peak of correlation value by, for example, FFT in order to calculate a desired phase shift quantity from the calculated pitch is also conceivable. In this manner, the watermark information detection signal 202 can be obtained by estimating the watermark information with the estimation unit 23 even regarding an image which has undergone an attack such as scaling.

The digital watermark detection sequence according to a present embodiment will be explained by using the flow chart shown in FIG. 10 hereinafter.

Firstly, the input image signal 201, which is the watermark information embedded image signal input via a recording medium or a transmission medium, is subjected to an enlargement or reduction process by the enlargement/reduction unit 21 to generate a scaled image signal (step S221). Next, the input image signal 201 and scaled image signal are subjected to a first orthogonal transformation, such as FFT by a first orthogonal transmission unit 25 (step S225). Next, the input image signal and the scaled image signal subjected to the first orthogonal transformation, i.e., the two orthogonal transformation image signals, are subjected to complex addition by the complex addition unit 26 (step S226).

Next, a second orthogonal transformation unit 27 subjects the signal obtained by the complex addition to a second orthogonal transformation (step S227). The second orthogonal is an equivalent or inverse transformation of the first transformation. in which case, if, for example, an FFT is carried out as the first orthogonal transformation, an FFT or an inverse FFT is carried out as the second orthogonal transformation.

Next, the estimation unit 23 estimates watermark information from the signal obtained by the second orthogonal transformation (phase only correlation value), and generates the watermark information detection signal 202 (step S223). In the estimation step S223, the watermark information is estimated by searching for a peak while subjecting the phase only correlation value to the phase shift. When observing the transition of the phase only correlation value, a peak appears at a certain position of the phase shift quantity. The polarity of this peak indicates the watermark information.

<Phase Only Correlation>

Figure 11:
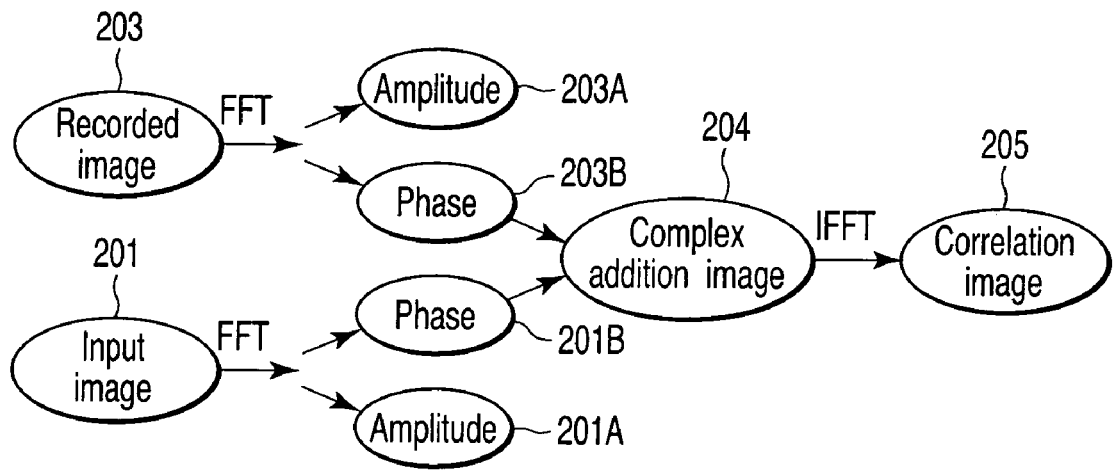
FIG. 11 illustrates a phase only correlation of the fourth embodiment.

A correlated calculation sequence carried out by the first orthogonal transformation unit 25, the complex addition unit 26 and the second transformation unit 27 (step S225, S226 and S227) is called the phase only correlation. In explanation by reference to FIG. 11, the phase only correlation is a sequence which calculates the correlation (resemblance) between the original image (registered image) signal 203 and the input image signal 201 to be collated. Firstly, the registered image signal 203, which is converted to a digital signal, is divided into amplitude information 203A (contrasting density data) and phase information 203B (image outline data) by mathematical processing under Fourier transformation. Equivalently, the input image signal 201, which is converted to digital signals, is divided into amplitude information 201A (contrasting density data) and phase information 201B (image outline data) by mathematical processing under Fourier transformation.

Secondly, the phase information 203B of the divided registered image signal 203 is subjected to amplitude compression. This is to collate the phase information 203B of the registered image signal 203 to the phase information 201B of the input image signal 201. In other words, correlation image processing is carried out by using only the phase information, without using amplitude information not including shape information in the registered image signal 203 and input image signal 201. As for the amplitude compression sequence, for example, the amplitude is fixed at 1. Similarly, the phase information 201B of divided input image signal 201 is subjected to the amplitude compression.

Lastly, each of phase information 203B and 201B of the registered image signal 203 and the input image signal 201 is subjected to complex addition to produce a complex addition image signal 204, which is subjected to inverse Fourier transformation to obtain a correlation image signal 205. Such a phase only correlation completely differs from the existing two-dimensional correlation method and feature extraction method, which use amplitude information, and is characterized as being robust over disturbance and making no major mistakes.

<Calculation Amount in Orthogonal Transformation>

Next, a calculation amount in a first orthogonal transformation will be explained in the case of using FFT for the first orthogonal transformation as an example. Assuming that an image of an input image signal 201 is N row×M column, the calculation amount of FFT (in this case, two-dimensional FFT) is described in the following formula.

$$\frac{1}{2} \times N \times (\text{Log}M + \text{Log}N) \qquad (1)$$

Here, in order to use three orthogonal transformations (two first orthogonal transformations for two images and the second orthogonal transformation) in the present embodiment, the following calculation amount is necessary.

$$\frac{3}{2} \times N \times M \times (\text{Log}M + \text{Log}N) \qquad (2)$$

Thus, in the present embodiment, the watermark information is estimated by generating the scaled image signal from the input image signal 201, which is the embedded image signal, and acquiring a correlation value restricted to the phases of the input image signal and scaled image signal with the first orthogonal transformation unit 25, the complex addition unit 26 and the second orthogonal transformation unit 27. In such case, since the peak of the correlation value can be searched for by carrying out correlated calculation while varying the phase, it is possible to easily detect watermark information from an embedded image signal subjected to, for example, a scaling attack.

Fifth Embodiment

Figure 12:
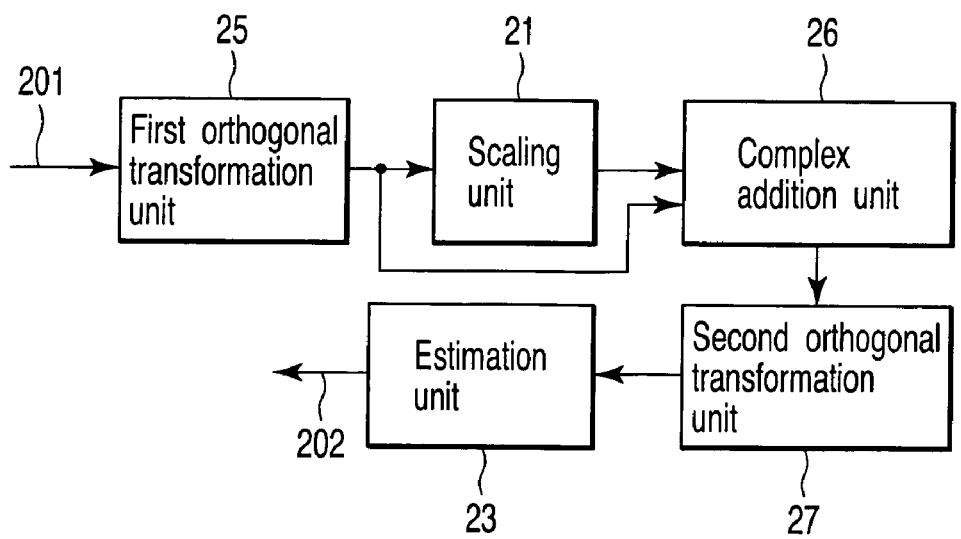
FIG. 12 is a block diagram of a digital watermark detection apparatus according to a fifth embodiment of the present invention.

The digital watermark detection apparatus according to a fifth embodiment of the present invention illustrated in FIG. 12, permutates in alignment the scaling unit 21 and the first orthogonal transformation unit 25 in the digital watermark detection apparatus of the third embodiment shown in FIG. 9. An input image signal 201 is subjected to a first orthogonal transformation by the first orthogonal transformation unit 25, and then is subjected to an enlargement or reduction process by the scaling unit 21. In a complex addition unit 26, the orthogonal transformation image signal of a scaled image signal and the orthogonal transformation image signal of an input image signal 201 are subjected to complex addition in a method similar to the third embodiment. Likewise the fourth embodiment. An amplitude compressor may be provided on the output stage of the complex addition unit 26 to subject the result signal obtained by the complex addition to an amplitude compression process, and the signal obtained by the amplitude compression process may be subjected to second orthogonal transformation by a second orthogonal transformation unit 27.

Figure 13:
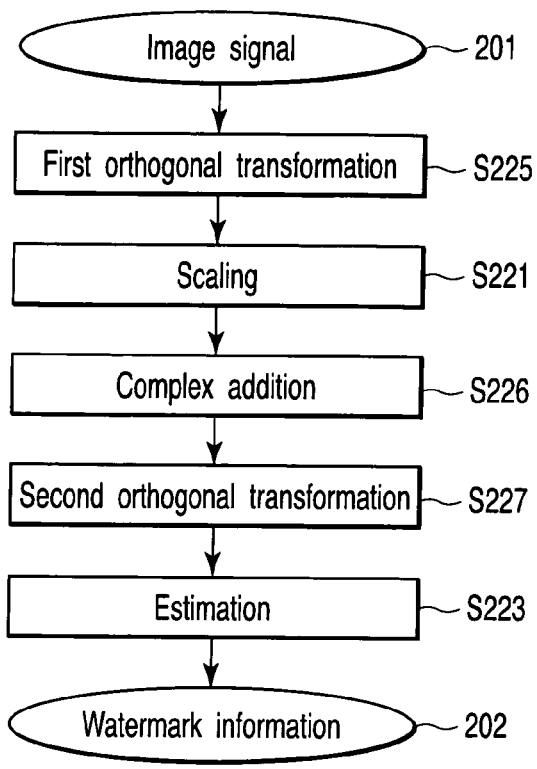
FIG. 13 is a flow chart showing a digital watermark detection sequence of the fifth embodiment.

FIG. 13 is a flow chart illustrating a digital watermark detection sequence of the present embodiment. Detailed explanations will be omitted since only the order of alignment between the first orthogonal transformation step S225 and the scaling step S221 are permuted from those in FIG. 10.

According to the present embodiment, a scaled image signal is generated after the input image signal 201 as the embedded image signal is subjected to orthogonal transformation. This scaled image signal and the orthogonal-transformed image signal of the embedded image signal are subjected to a phase only correlation to estimate and detect the watermark information from the phase only correlation value. As the scaling process and orthogonal transformation process are linear processes, the processing result will not be changed by such permutation of order. It is possible by a process order reducing in calculation amount to reduce the calculation amount.

Sixth Embodiment

Figure 14:
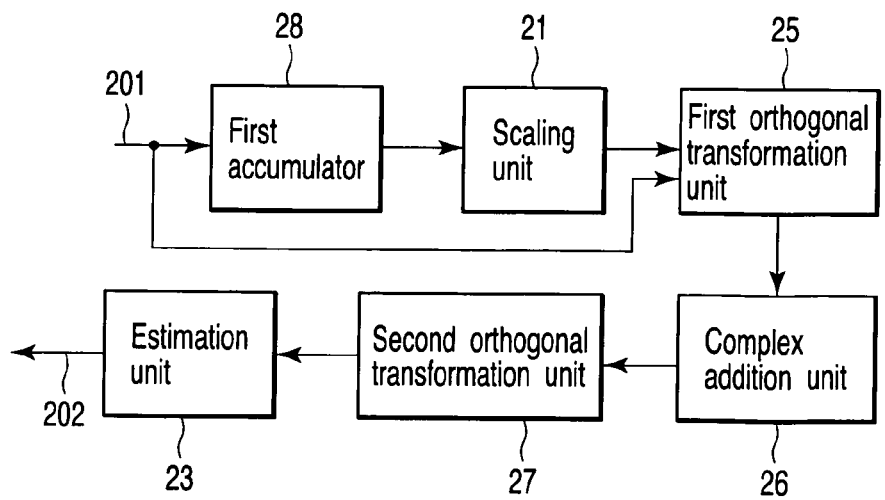
FIG. 14 is a block diagram of a digital watermark detection apparatus according to a sixth embodiment of the present invention.

According to the digital watermark detection apparatus related to a sixth embodiment of the present invention illustrated in FIG. 14, firstly, an input image signal 201 is accumulated for a predetermined accumulation period by a first accumulator 28, whereby a first accumulated signal is generated. Generating a first accumulated signal, the first accumulator 28 is reset, to carry out the next accumulation anew.

The first accumulated signal from the first accumulator 28 is subjected to scaling by the scaling unit 21 to generate a scaled image signal. The scaling unit 21 is a digital filter which carries out the same scaling (at the same scaling rate as the time of embedding) as the scaling unit 11 used in the digital watermark embedding apparatus shown in FIG. 1. The first accumulated signal and the scaled image signal generated by the scaling unit 21 are subjected to a first orthogonal transformation, such as FFT, by the first orthogonal transformation unit 25 and are subjected to complex addition by the complex addition unit 26. In other words, the orthogonal transformation image signal of the input image signal 201 and the orthogonal transformation image signal of the scaled image signal are subjected to complex addition.

After complex addition, the signal is subjected to a second orthogonal transformation by the second orthogonal transformation unit 27. The second orthogonal transformation is either the same transformation as the first orthogonal transformation or an inverse transformation of the first orthogonal transformation. For example, if FFT is carried out as the first orthogonal transformation, either an FFT or an inverse FFT is carried out as the second orthogonal transformation. Further, likewise the fourth embodiment, an amplitude compressor may be provided on the output stage of the complex addition unit 26 to subject the result signal obtained by the complex addition to amplitude compression process. Then, the signal obtained by the amplitude compression process may be subjected to a second orthogonal transformation by a second orthogonal transformation unit 27. The estimation unit 23 estimates the watermark information from the data obtained by the second orthogonal transformation, whereby a watermark information detection signal 202 is generated.

Next, a digital watermark detection sequence according to a present embodiment will be explained by using the flow chart illustrated in FIG. 15.

To start with, the input image signal 201, which is an embedded image signal, is accumulated by the first accumulator 28 (step S228). In step S228, the first accumulated signal is output by accumulating the input image signal 201 over a short period of time, such as a couple of lines, one field, a couple of fields, one frame or a couple of frames, so that the character of an image is not subjected to major changes.

The first accumulated signal obtained in the first accumulation step S228 is subjected to the scaling process by the scaling unit 21 (step S221).

The first accumulated signal and the scaled image signal obtained by enlargement/reduction are subjected to the first orthogonal transformation, such as FFT, by the first orthogonal transformation unit 25 scaling (step S225).

The signal undergone the orthogonal transformation process is subjected to complex addition by a complex addition unit 26 (step S226). Here, the orthogonal transformation image signals of the signal undergone enlargement/reduction and the input image signal 201 are subjected to complex addition scaling.

The signal undergone the complex addition is subjected to the second orthogonal transformation by the second orthogonal transformation unit 27 (step S227). The second orthogonal transformation is either the same transformation as the first orthogonal transformation or the inverse transformation thereof. For example, when carrying out FFT as the first orthogonal transformation, the FFT or an inverse FFT is performed as the second orthogonal transformation.

The estimation unit 23 searches for the peak of correlation value while subjecting the data obtained by the second orthogonal transformation to phase shift to estimate and detect the watermark information (step S223). When observing the transition of the correlation value, a peak appears at a certain position of the phase shift quantity. The polarity of this peak indicates the watermark information.

In this manner, according to the present embodiment, after the input image signal 201 is accumulated, it is subjected to the phase only correlation. As a result, a correlation result robust over the input image signal 201 is computed, enabling the realization of digital watermark detection robust over the input image signal 201 and at a high rate.

<First Accumulator 28>

Figure 16:
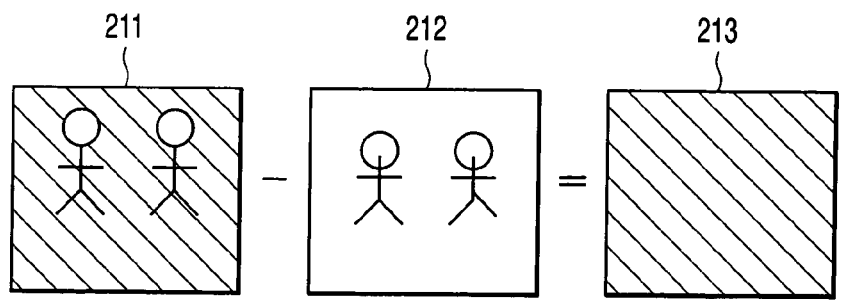
FIG. 16 illustrates an accumulation of an input image of the sixth embodiment.

There will be described an example of a method of accumulating the input image signal 201 in the first accumulator 28 referring to FIG. 16. Assuming that the input image signal 201 includes both signal components of a watermark embedded image 211 in which watermark information is embedded and a watermark non-embedded image 212 in which watermark information is not embedded as shown in FIG. 6. In this case, when accumulating the input image signal 201, the first accumulator 28 calculates a difference between the signal component of the watermark embedded image 211 and the signal component of the watermark non-embedded image 212 to obtain an embedded image signal 213 containing only an embedded component. If the embedded image signal 213 is used as an input signal in the present embodiment, a correlation result robust over the input image signal 213 is calculated, resulting in enabling the realization of watermark detection robust over the input image signal 201 and at high detection rate.

An accumulation pattern of the first accumulator 28 will be described in conjunction with FIGS. 19 to 20 hereinafter. In the case of, as an accumulation pattern of the first accumulator 28, for example, adding all fields (or frames) as illustrated in FIG. 19, there is conceivable a method of carrying out addition and subtraction periodically by interlacing addition and subtraction for each field (or frame) as illustrated in FIGS. 20 and 21. These accumulation patterns are determined in association with the embedding pattern of the watermark information on the digital watermark embedding side so that the correlation of the watermark information with respect to the input image signal enhances.

As a modification of the sixth embodiment, the first accumulator 28 may be added to the front stage of the scaling unit 11 in FIG. 4, the front stage of the autocorrelation unit 24 or the scaling unit 11 in FIG. 7, or the front stage of the scaling unit 11 in FIG. 9.

Seventh Embodiment

Figure 17:
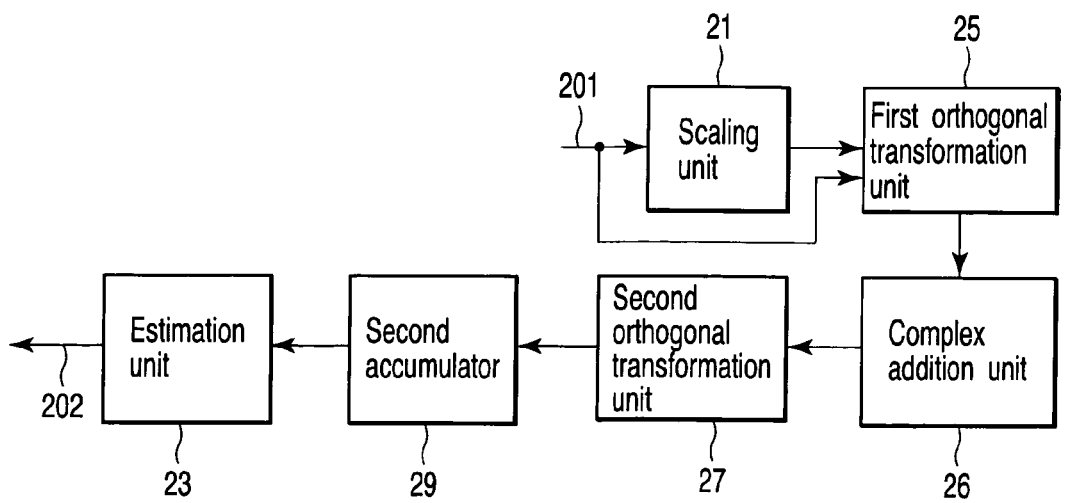
FIG. 17 is a block diagram of a digital watermark detection apparatus according to a seventh embodiment of the present invention.

According to the digital watermark apparatus related to a seventh embodiment of the present invention illustrated in FIG. 17, an input image signal 201 is first subjected to scaling, i.e., enlargement or reduction process, by a scaling unit 21. The scaling unit 21 carries out enlargement or reduction process at the same scaling rate as carried out by the scaling unit 11 used in the digital watermark embedding apparatus in FIG. 1, to generate a scaled image signal.

The input image signal 201 and the scaled image signal generated by the scaling unit 21 are input to a first orthogonal transformation unit 25 to be subjected to a first orthogonal transformation, such as FFT. As a result, orthogonal transformation image signals of the scaled image signal and input image signal 201 are produced. The orthogonal transformation image signals of the scaled image signal and input image signal 201 are input to a complex addition unit 26 and are subjected to complex addition thereby.

The signal obtained by the complex addition is subjected to a second orthogonal transformation by a second orthogonal transformation unit 27. The second orthogonal transformation is the same transformation as the first orthogonal transformation or an inverse transformation thereof. If, for example, FFT is carried out as the first transformation, FFT or an inverse FFT is carried out as the second orthogonal transformation. Like the fourth embodiment, an amplitude compressor is provided on the pre-stage of the complex addition unit 26 so that the result signal obtained by the complex addition may be subjected to an amplitude compression process and then to a second orthogonal transformation by a second orthogonal transformation unit 27.

The signal obtained by the second orthogonal transformation is provided to the input of a second accumulator 29, which accumulates the input signal over a certain accumulation period to generate a second accumulated signal. The accumulation period is chosen, for example, as 15 seconds, 30 seconds or one minute. When the second accumulator 29 accumulates the input signal over the accumulation period to output the second accumulated signal, it is reset.

The second accumulated signal is supplied to the input of the watermark information estimation unit 23. The estimation unit 23 obtains a correlation value between the original second accumulation signal not subjected to the phase shift and the second accumulation signal being continuously subjected to the phase shift, and searches for the peak of the correlation value to estimate the watermark information and detect it. When observing the transition of the correlation value, a peak appears at a certain position of the phase shift quantity. The polarity of such peak indicates the watermark information. Further, a method of computing a desired phase shift quantity from a pitch of the correlation value peak, which is computed by FFT, is also conceivable. In such manner, even when the input image signal 201 is attacked by scaling etc., watermark information can be detected by the estimation unit 23 to obtain the watermark information detection signal 202.

Thus, according to the present embodiment, it is considered that the accumulation of the correlation signal enables the computation of a robust correlation result for the input image signal 201, and by extending the accumulation period, digital watermark detection robust over the input image signal 201 and at a high rate can be realized.

<Second Accumulator 29>

In the case of, as an accumulation pattern of the second accumulator 29, for example, adding all fields (or frames) as illustrated in FIG. 19, there is conceivable a method of carrying out addition and subtraction periodically by interlacing addition and subtraction per field (or per frame) as illustrated in FIGS. 20 and 21. These accumulation patterns are determined in association with the embedding pattern of the watermark information on the digital watermark embedding side so that the correlation of the watermark information with respect to the input image signal enhances.

Figure 18:
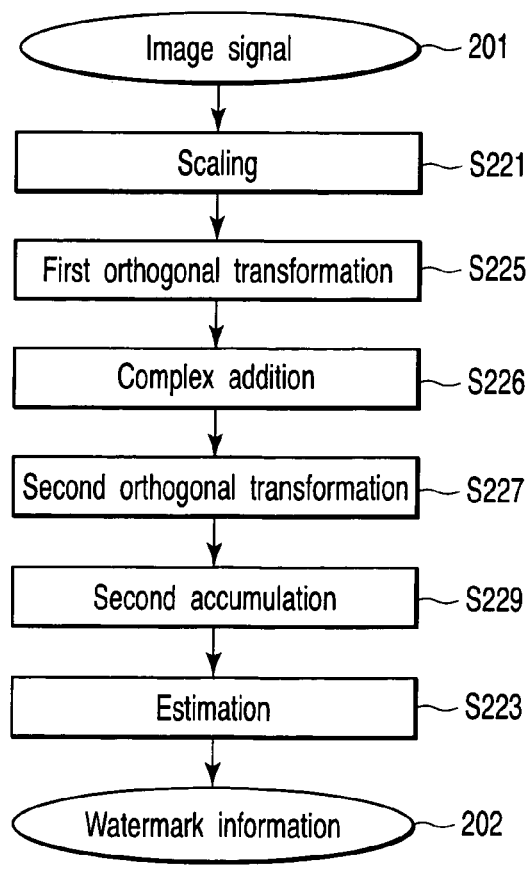
FIG. 18 is a flow chart showing a digital watermark detection sequence of the seventh embodiment.

A sequence of preventing unauthorized copy according to the present embodiment is explained referring to the flow chart illustrated in FIG. 18 hereinafter.

First, the input image signal 201, which is a watermark embedded image signal input via a recording medium or transmission medium, is subjected to an enlargement or reduction process by the scaling unit 21 to generate a scaled image signal (step S221). The input image signal 201 and scaled image signal are subjected to the first orthogonal transformation, such as FFT, by the first orthogonal transformation unit 25 (step S225). The input image signal and scaled image signal obtained by the first orthogonal transformation, i.e., the two orthogonal transformation signals, are subjected to complex addition by the complex addition unit 26 (step S226).

The signal obtained by the complex addition is subjected to the second orthogonal transformation by the second orthogonal transformation unit 27 (step S227). The second orthogonal transformation is the same transformation as the first orthogonal transformation or an inverse transformation thereof. For example, if FFT is carried out as the first orthogonal transformation, FFT or an inverse FFT is carried out as the second orthogonal transformation.

Figure 15:
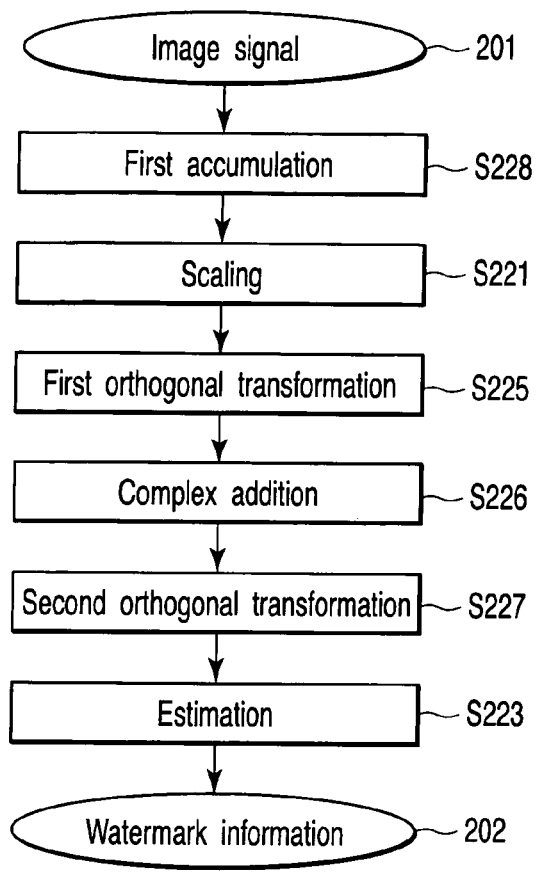
FIG. 15 is a flow chart showing a digital watermark detection sequence of the sixth embodiment.

The second accumulator 29 accumulates the input image signal 201 to the signal obtained by the second orthogonal transformation over the same accumulation period as that in the first accumulation step S228 in FIG. 15 to generate a second accumulated signal (step S229). Once the second accumulated signal is output after accumulation over the accumulation period, the second accumulation step S229 is reset.

The estimation unit 23 estimates the watermark information from the second accumulated signal to output a watermark information detection signal 202 (step S223). In the estimation step S223, a correlation value between the original second accumulated signal not subjected to a phase shift and the second accumulated signal being continuously subjected to the phase shift is obtained. By searching for the peak of such correlation value, the watermark information is estimated and detected. When observing the transition of the correlation value, a peak appears at a certain position of the phase shift quantity. The polarity of such peak indicates the watermark information.

The second accumulated signal is supplied to the input of the estimation unit 23. The estimation unit 23 estimates and detects the watermark information by searching for the peak of the correlation value while carrying out the phase shift. When observing the transition of the correlation value, the peak appears at a certain position of the phase shift quantity. The polarity of such peak indicates the watermark information.

Eighth Embodiment

Figure 23:
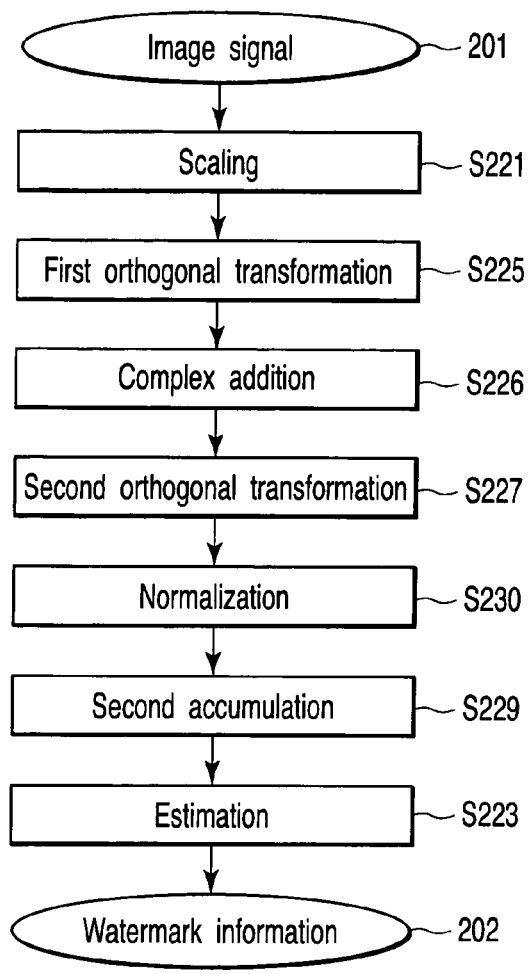
FIG. 23 is a flow chart showing a digital watermark detection sequence of the eighth embodiment.

FIG. 22 illustrates a digital watermark detection apparatus according to an eighth embodiment of the present invention, which adds a normalization unit 30 between the output of the first orthogonal transformation unit 27 and the input of the second accumulator 29 of the digital watermark detection apparatus according to the seventh embodiment shown in FIG. 17. FIG. 23 is a flow chart illustrating the digital watermark detection sequence in the present embodiment, which adds a normalization step S230 between the first orthogonal transformation step 227 and the second accumulation step S229 of the flow chart illustrated in FIG. 18 related to the seventh embodiment.

Thus, according to the present embodiment, by normalizing and then accumulating the signal obtained by the first orthogonal transformation, a correlation result robust over the input image signal 201 is computed, and by extending the accumulation period, digital watermark detection robust over the input image signal 201 and at a high rate can be realized.

Ninth Embodiment

Figure 24:
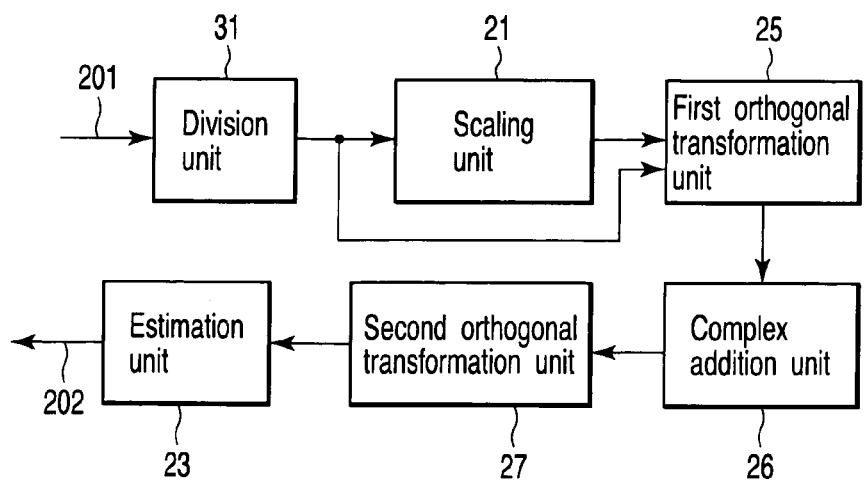
FIG. 24 is a block diagram of a digital watermark detection apparatus of a ninth embodiment of the present invention.

FIG. 24 illustrates a digital watermark detection apparatus according to a ninth embodiment of the present invention. the embedded image signal 103 generated by the digital watermark embedding apparatus shown in FIG. 1 is supplied to the digital watermark detection apparatus of FIG. 24 as an input image signal 201 via a recording medium or a transmission medium like the digital watermark detection apparatus of FIG. 1.

In the present embodiment, a division unit is added to the input stage of the digital watermark detection apparatus according to the third embodiment shown in FIG. 9. The division unit 31 divides the input image signal 201 into at least two divided image signals. The divided image signals are then processed by the scaling unit 21, the first orthogonal transformation unit 25, the complex addition unit 26, the second orthogonal transformation unit 27 and the estimation unit 23, like the third embodiment, in order to detect the watermark information.

Figure 10:
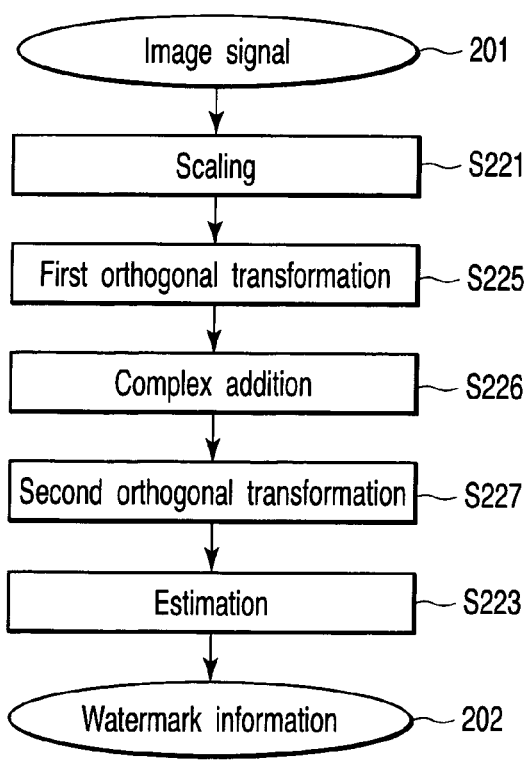
FIG. 10 is a flow chart showing a digital watermark detection sequence of the fourth embodiment.
Figure 25:
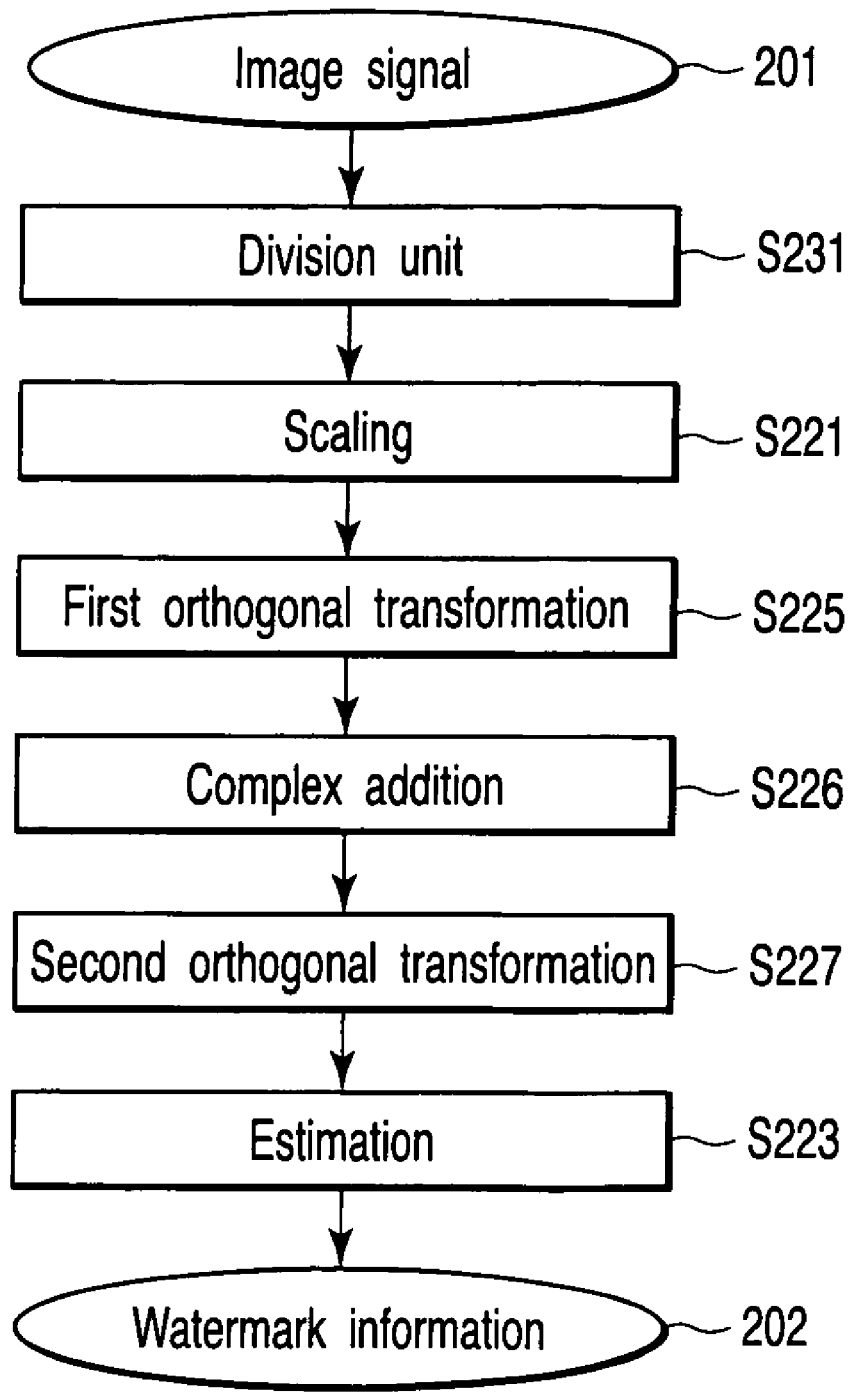
FIG. 25 is a flow chart showing a digital watermark detection sequence of the ninth embodiment.

FIG. 25 is a flow chart indicating the digital watermark detection sequence of the present embodiment, which adds a division step S231 to the flow chart in FIG. 10 illustrating the digital watermark detection sequence according to the third embodiment.

According to the present embodiment, by carrying out detection process of the watermark information by dividing the input image signal 201, the throughput of two-dimensional orthogonal transformation and the like carried out by the first orthogonal transformation unit 25 and the second orthogonal transformation unit 27 can be reduced, thereby enabling the reduction of the calculation amount for the phase only correlation.

A method of dividing the input image signal 201 in units of n row (n is an integral number of 1 or more) or in units of m column (m is an integral number of 1 or more) is conceivable in the division unit 31 and step S231. When dividing the input image signal 201 in units of n row, the maximum division number equals the number of rows of image. It is also conceivable to divide the input image signal 201 in units of n=1 row and accumulate a one-dimensional processed result of the image signal (one-dimensional phase only correlation result) for the number of rows. Equivalently, when dividing the input image signal 201 in units of m column, the maximum division number equals the number of columns of image. It is also conceivable to divide the input image signal 201 in units of m=1 column and accumulate a one-dimensional processed result of the image signal (one-dimensional phase only correlation result) for the number of columns.

<Phase Only Correlation>

Figure 26:
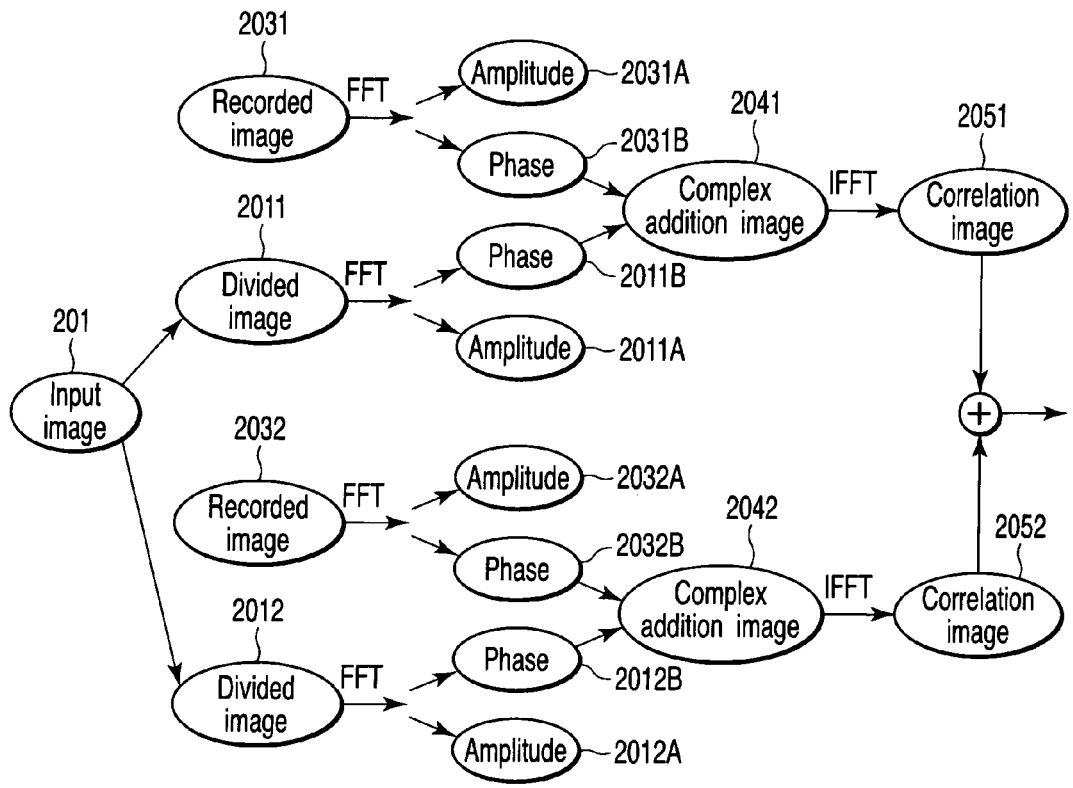
FIG. 26 illustrates a division process of an input image in the ninth embodiment.

As explained in the fourth embodiment, the phase only correlation is the correlated calculation carried out by the first orthogonal transformation unit 25, the complex addition unit 26 and the second orthogonal transformation unit 27 (step S225, S226 and S227). The flow of phase only correlation sequence upon dividing the input image signal 201 is illustrated in FIG. 26. The case of dividing the input image signal 201 in two signals is explained hereinafter.

At first, the input image signal 201 is divided into two divided image signals 2011 and 2012, which are t subjected to the phase only correlation process. In order to calculate the correlation (similarities) of the original registered image signal 2031 and the input image signal 2011 to be collated therewith, the digital registered image signals 2031 and 2032 are mathematically processed by Fourier transformation to be decomposed into amplitude information 2031A, 2032A (thickness data) and phase information 2031B, 2032B (image outline data). Similarly, the digital divided image signals 2011 and 2012 are mathematically processed by Fourier transformation to be decomposed into amplitude information 2011A, 2012A (thickness date) and phase information 2011B, 2012B (image outline data).

The decomposed phase information 2031B and 2032B of the registered image signals 2031 and 2032 are subjected to amplitude compression. This is done to collate the phase information 2031B and 2032B of the registered image signals 2031 and 2032 with the phase information 2011B and 2012B of the divided image signals 2011 and 2012. In other words, the correlation between the registered image signal and the divided image signal is obtained by using only the phase information, and not using the phase information including no shape information. As a method of amplitude compression, for example, the amplitude is fixed as 1. Similarly, the phase information 2011B and 2012B of the decomposed divided image signals 2011 and 2012 are subjected to the amplitude compression.

Each of the phase information 2031B and 2011B of the registered image signal 2031 and divided image signal 2011 are subjected to complex addition in order to produce a complex addition image signal 2041, which is subjected to inverse Fourier transformation whereby a correlation image signal 2051 is obtained. Similarly, each of the phase information 2032B and 2012B of the registered image signal 2032 and divided image signal 2012 are subjected to complex addition in order to produce a complex addition image signal 2042, which is subjected to inverse Fourier transformation whereby a correlation image signal 2052 is obtained. Such phase only correlation is completely different from the existing two-dimensional correlation method and feature extraction method, which use amplitude information, and is characterized as being robust over disturbance and making no major mistakes.

<Calculation Amount in Orthogonal Transformation>

The calculation amount in the first orthogonal transformation will be explained by taking the case of using FFT for the first orthogonal transformation as an example. When the input image signal 201 is N row×M column, and N rows are divided in n rows of k pieces, the calculation amount is as follows.

$$k \times \frac{3}{2} \times n \times M \times (\text{Log}M + \text{Log}n) \quad (3)$$

In this case, assuming that N=128 and M=512, if the input image signal 201 is divided in N pieces and is subjected to a one-dimensional process for the number of rows (k=128, n=1), the calculation amount is as follows.

$$k \times \frac{3}{2} \times n \times M \times (\text{Log}M + \text{Log}n) = 128 \times \frac{3}{2} \times 1 \times 512 \times (9+0) \quad (4)$$

For comparison, when such division is not carried out, that is, n=128, k=1, the calculation amount is as follows.

$$k \times \frac{3}{2} \times n \times M \times (\text{Log}M + \text{Log}n) = 1 \times \frac{3}{2} \times 128 \times 512 \times (9+7) \quad (5)$$

By carrying out process of dividing the input image signal 201 into a plurality of signals in this manner, the calculation amount can be reduced. The calculation amount decreases with an increase of the number of divisions.

Tenth Embodiment

Figure 27:
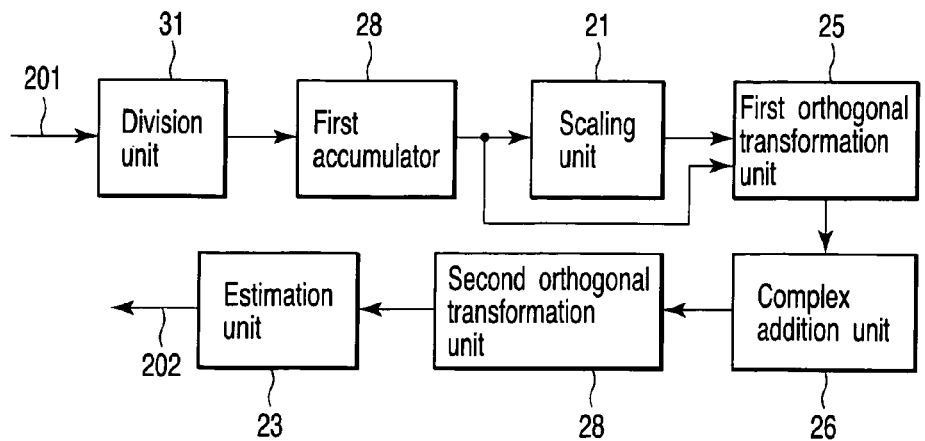
FIG. 27 is a block diagram of a digital watermark detection apparatus according to a tenth embodiment of the present invention.

FIG. 27 illustrates a digital watermark detection apparatus according to a tenth embodiment of the present invention, which adds a division unit 31 to the input stage of the digital watermark detection apparatus according to the sixth embodiment shown in FIG. 14. The division unit 31 divides the input image signal 201 into at least two divided image signals like the ninth embodiment. The divided image signals are subsequently processed by the first accumulator 28, the scaling unit 21, the first orthogonal transformation unit 25, the complex addition unit 26, the second orthogonal transformation unit 27 and the estimation unit 23 like the sixth embodiment, whereby watermark information is detected.

Figure 28:
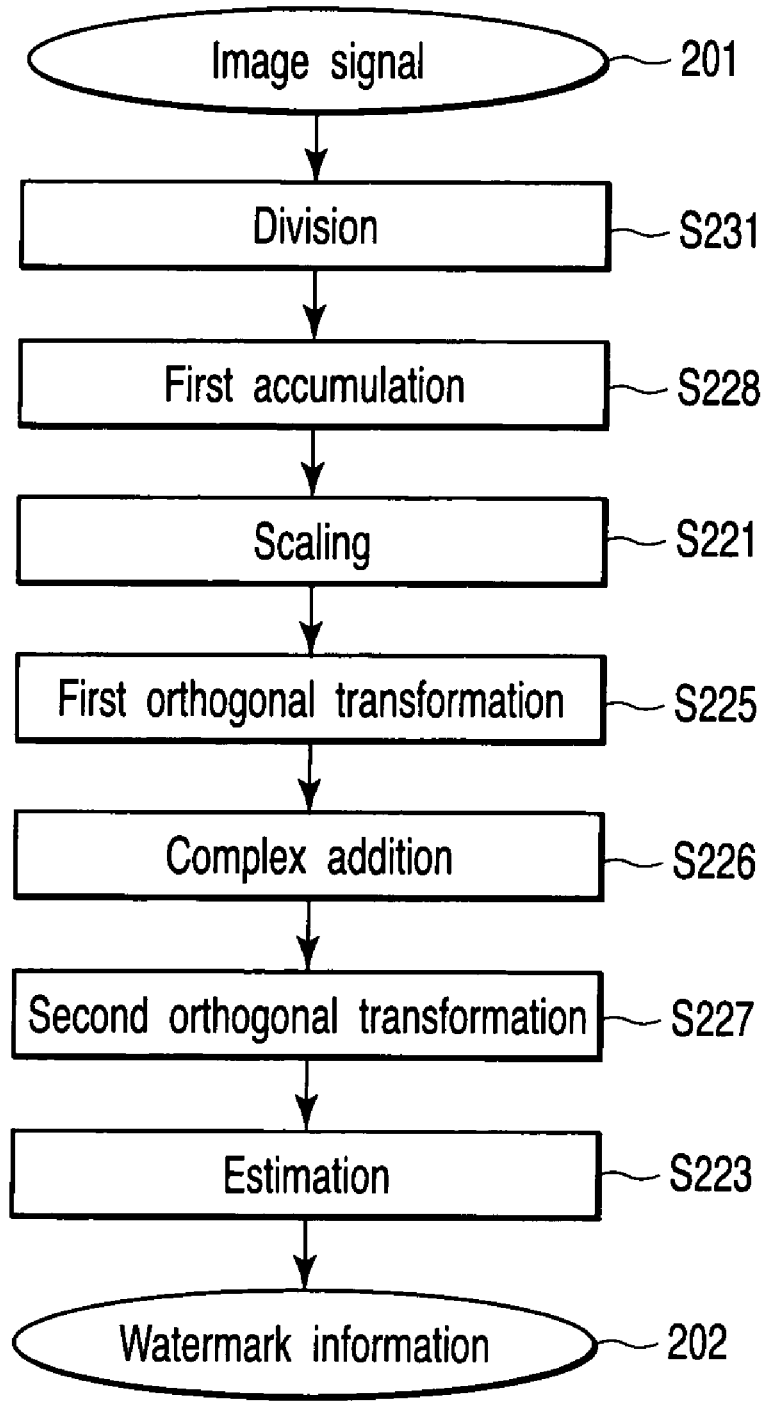
FIG. 28 is a flow chart showing a digital watermark detection sequence of the tenth embodiment.

FIG. 28 is a flow chart illustrating the digital watermark detection sequence of the present embodiment, which adds a division step S231 to the flow chart of FIG. 15 showing the watermark detection sequence according to the sixth embodiment.

In the case that the first orthogonal transformation unit 25 and the second orthogonal transformation unit 27 subject the two-dimensional image signal to a two-dimensional process such as orthogonal transformation, for example, two-dimensional FFT, there is conceivable a method of dividing the two-dimensional image in units of row by the division unit 31 and accumulating the divided images after subjecting the divided images to the one-dimensional process such as one-dimensional FFT, for the number of rows.

In this manner, according to the present embodiment, by carrying out a process of dividing the input image signal 201 into a plurality of signals, the calculation amount of phase only correlation can be reduced similarly to the ninth embodiment.

Eleventh Embodiment

Figure 29:
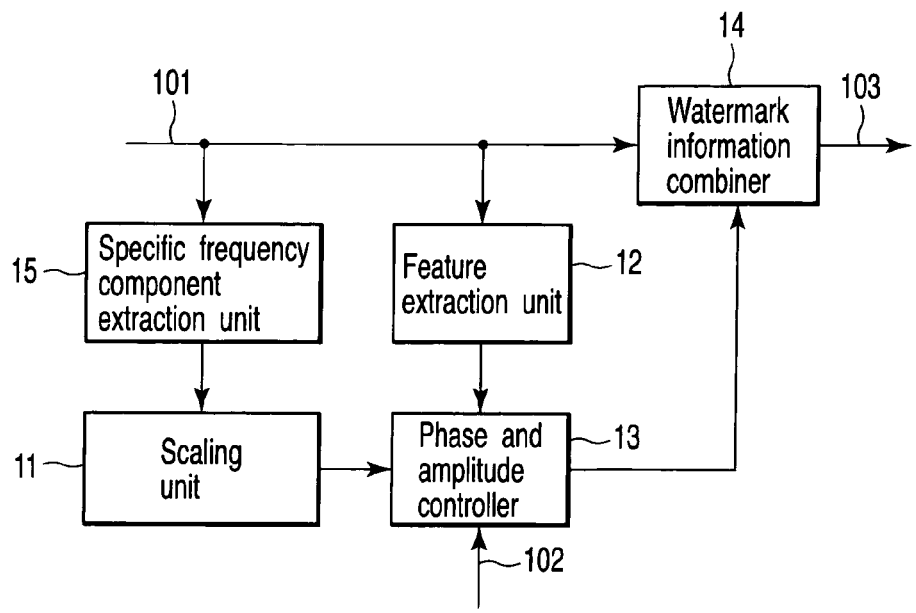
FIG. 29 is a block diagram of a digital watermark embedding apparatus according to a eleventh embodiment of the present invention.

FIG. 29 illustrates a digital watermark embedding apparatus according to an eleventh embodiment of the present invention. In the present embodiment, there is described only the difference from the digital watermark embedding apparatus of the first embodiment illustrated in FIG. 1. The input image signal 101 in which watermark information is to be embedded is input to a specific frequency element extraction unit 15 as well as the feature extract unit 12 and watermark information combiner 14, and the output signal of the specific frequency component extraction unit 15 is input to the scaling unit 11.

The specific frequency component extraction unit 15 comprises a digital filter of a frequency domain, such as a highpass filter possessing a predetermined cutoff frequency, or a bandpass filter possessing a predetermined passband center frequency, and extracts a specific frequency component, such as a relatively high frequency component, from the input image signal 101. A signal of the specific frequency component generated from the specific frequency component extraction unit 15 is input to the scaling unit 11 and is scaled. Explanations will be omitted, as subsequent operations are the same as the first embodiment.

Figure 2:
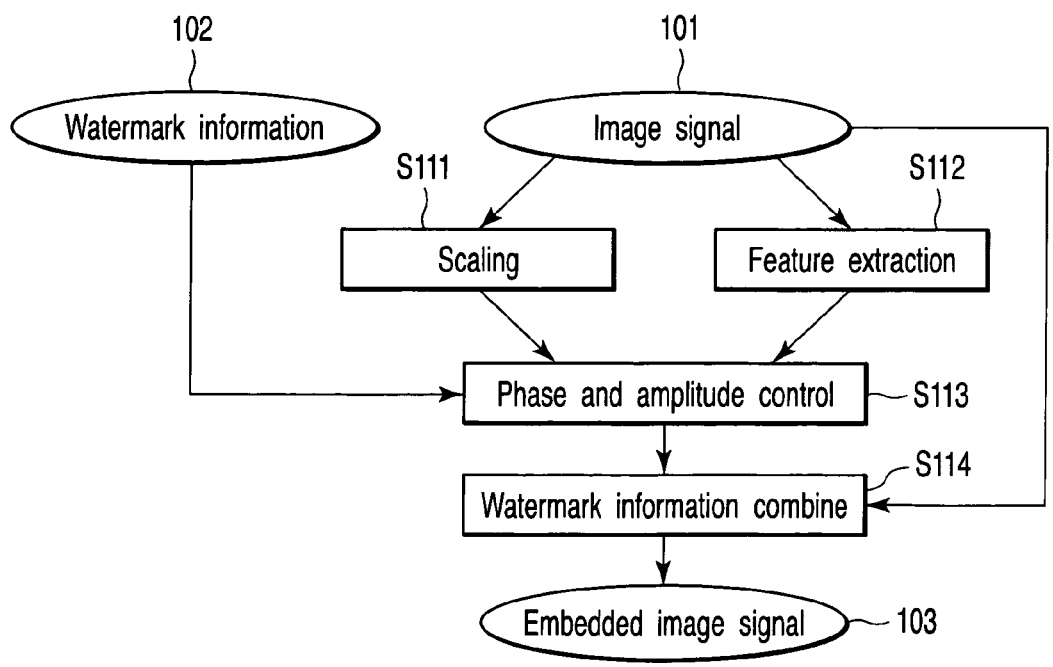
FIG. 2 is a flow chart showing a digital watermark embedding sequence of the first embodiment.
Figure 30:
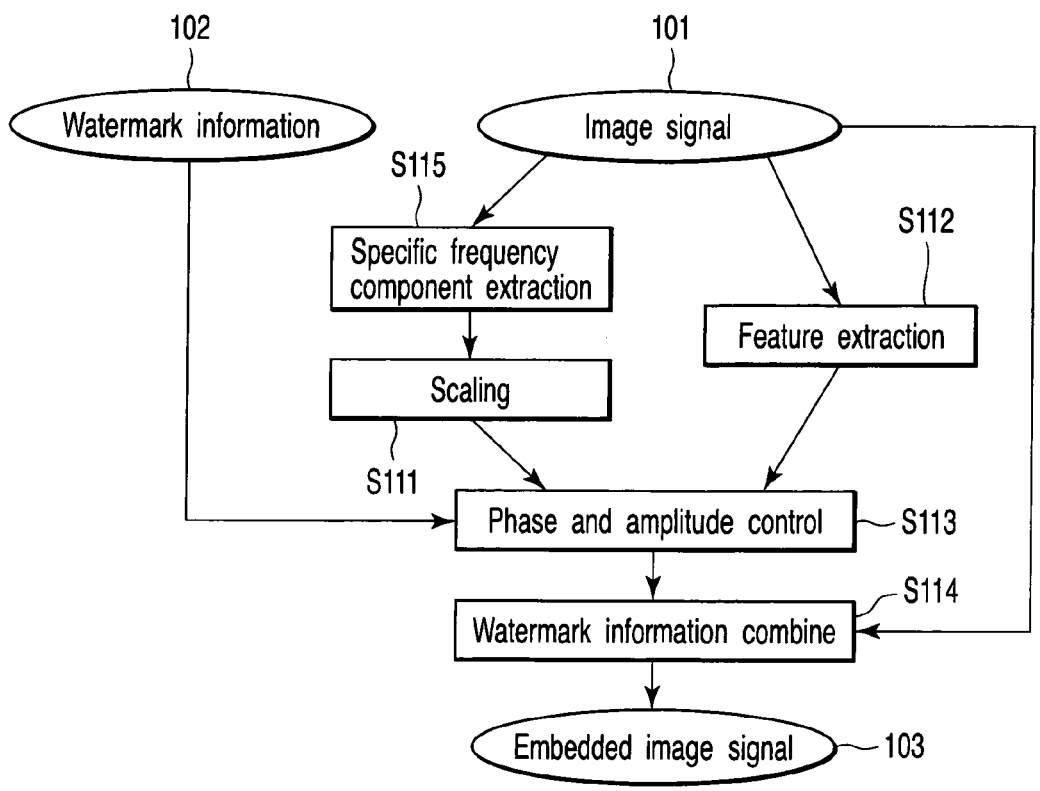
FIG. 30 is a flow chart showing a digital watermark embedding sequence of the eleventh embodiment.

FIG. 30 is a flow chart illustrating a digital watermark embedding sequence for the present embodiment, which adds only the specific frequency component extraction step 115 to the flow chart of FIG. 2. Detailed explanations will be omitted accordingly.

In the present embodiment, extraction of the specific frequency component is carried out before the scaling, however, as these processes are all in linear process, it is also possible to change the order of flow between the specific frequency component extraction and the scaling process, i.e., carry out the specific frequency component extraction after the scaling.

Twelfth Embodiment

There will be described an twelfth embodiment of a digital watermark detection apparatus to detect embedded watermark information 102 from an embedded image signal 103, in which the watermark information 102 is embedded by the digital watermark embedding apparatus of the eleventh embodiment and which is recorded on a recording medium by a digital image recording playback apparatus such as a DVD system, or is transmitted via a transmission medium such as internet, a broadcasting satellite or a communication satellite.

Figure 31:
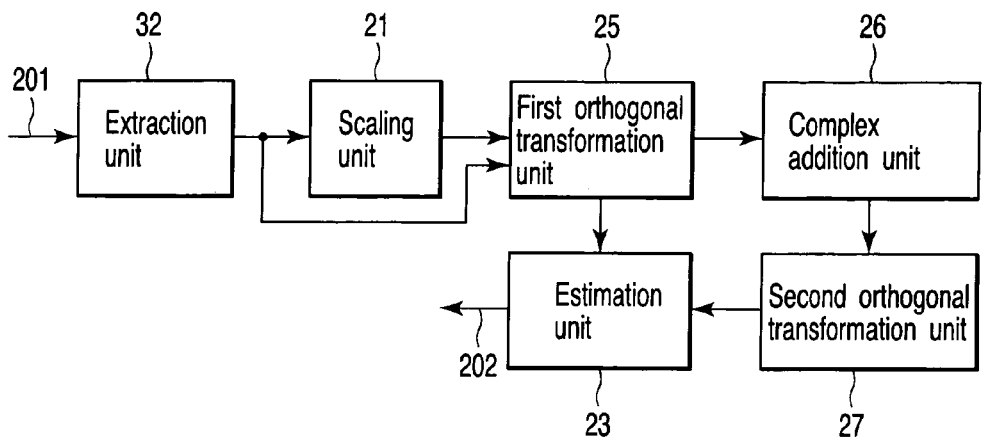
FIG. 31 is a block diagram of a digital watermark detection apparatus according to a twelfth embodiment of the present invention.

FIG. 31 shows a digital watermark detection apparatus of the twelfth embodiment of the present invention, which adds an extraction unit 32 to the digital watermark detection apparatus of the fourth embodiment shown in FIG. 9. In other word, the embedded image signal 103 generated by the digital watermark embedding apparatus illustrated in FIG. 31 is supplied to the digital watermark detection apparatus in FIG. 31 as an input image signal 201 via a recording medium or a transmission medium. Only a certain specific frequency component is extracted from the input image signal 201 by the extraction unit 32.

The extraction unit 32 is a digital filter, such as an HPF possessing a predetermined cutoff frequency or a BPF possessing a predetermined passband center frequency, having the same frequency domain as the specific frequency component extraction unit 15 used in the digital watermark embedding apparatus in FIG. 31, which extracts a signal of a specific frequency component, such as a relatively high frequency component, from the input image signal 201. A signal of the specific frequency component extracted by the extraction unit 31 is scaled by the scaling unit 21. Explanations on the compositions thereafter the scaling unit 21 will be omitted as being the same as FIG. 9.

Figure 32:
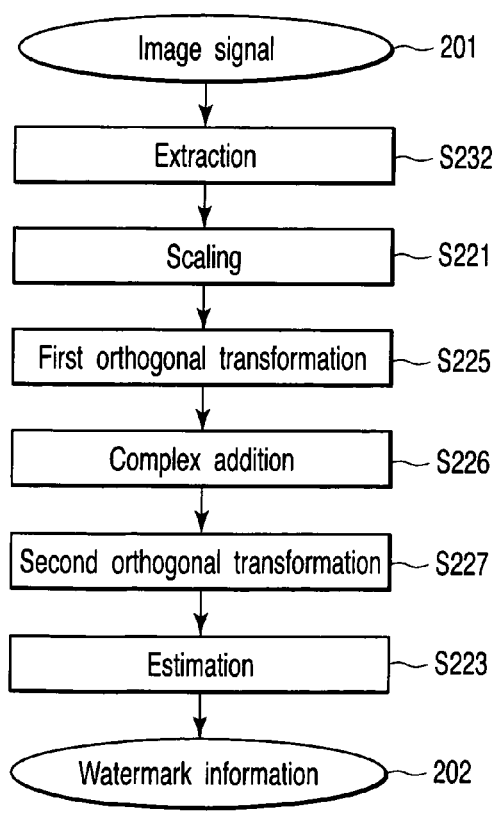
FIG. 32 is a flow chart showing a digital watermark detection sequence of the twelfth embodiment.

FIG. 32 is a flow chart illustrating the digital watermark detection sequence for the present embodiment, which only adds an extraction step S232 to the flow chart in FIG. 10 illustrating the digital watermark detection sequence of the fourth embodiment. Detailed explanations will be omitted, accordingly.

As explained in the eleventh and twelfth embodiments, even if the specific frequency component of the input image signal is subjected to the scaling process by the scaling unit before carrying out subsequent processes, the same effect as the first and third embodiments is obtained.

In the present embodiment, extraction of the specific frequency component is carried out before the scaling, however, as these processes are all in linear process, it is also possible to change the order of flow between the specific frequency component extraction and the scaling process, i.e., carry out the specific frequency component extraction after the scaling.

In the present embodiment the method of embedding and detecting the watermark using the phase only correlation is described. However, other correlations such as a cross-correlation can be used for embedding and detecting the digital watermark by extracting a specific frequency component according to the similar digital watermark detection sequence.

Several specific examples of the watermark information estimation unit 23 used in the second to tenth and twelfth embodiments will be explained.

SPECIFIC EXAMPLE 1 OF THE WATERMARK INFORMATION ESTIMATION UNIT

Figure 33:
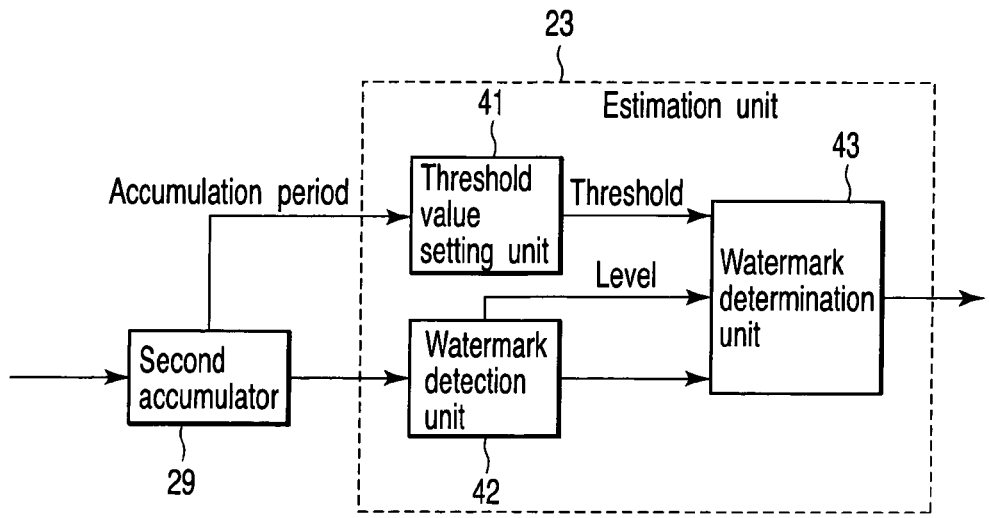
FIG. 33 is a block diagram illustrating a first specific example of an estimation unit in the digital watermark embedding apparatus according to a twelfth embodiment.
Figure 34:
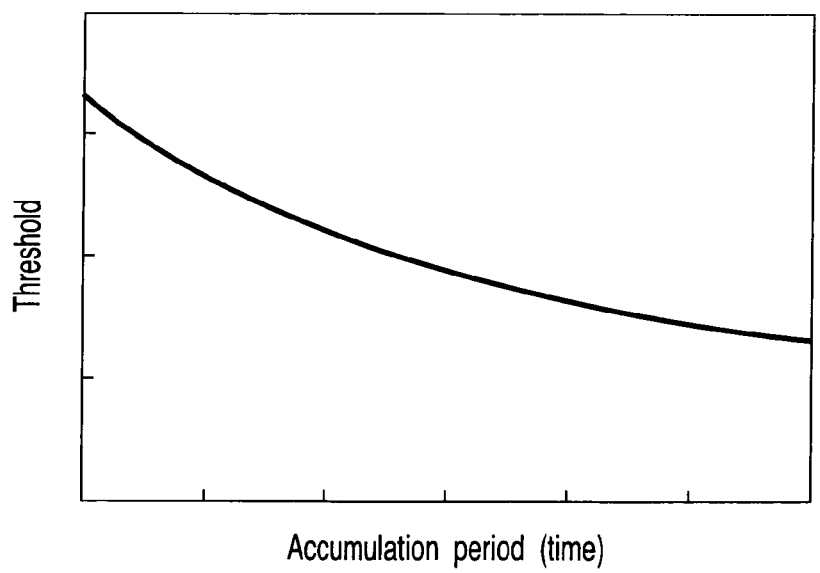
FIG. 34 illustrates a transition of a threshold value fixed by a threshold value setting unit in FIG. 33, which changes in accordance with the accumulation period.

An accustomed estimation unit 23 illustrated in FIG. 33 has a threshold value setting unit 41, a watermark detection unit 42 and a watermark determination unit 43. The threshold value setting unit 41 obtains information in the accumulation period from the pre-stage second accumulation unit 29, changes the threshold value of the detection determination of the watermark information as illustrated in FIG. 34 in compliance with the accumulation period, and provides it to the determination unit 43. The watermark detection unit 42 receives the accumulated signal from the pre-stage second accumulator 29 and detects the watermark information therefrom to output the watermark information and watermark level (absolute value of the peak amplitude of the accumulated signal) to the watermark determination unit 43.

The watermark determination unit 43 determines the level given by the watermark detection unit 42 depending on the threshold value provided by the threshold value setting unit 41. More specifically, if the watermark level is greater or equal to the threshold value, the watermark determination unit 43 determines that the watermark information is detected and outputs the watermark information input from the watermark detection unit 42. Meanwhile, if the watermark level is below the threshold value, the watermark determination unit 43 determines that the watermark information is not embedded and outputs information such as "no watermark". Although the threshold value is basically set lower as the accumulation period gets longer, vice versa is also possible. The watermark determination unit 43 can determine presence or absence of the watermark information according to a threshold value depending on a predetermined time interval (for example, 15 seconds, 30 seconds, one minute etc.) for every predetermined time interval, or a threshold value changing continuously in each case while carrying out accumulation.

As stated above, the present embodiment enables improved detection capability without increasing the calculation amount or circuit dimension necessary for watermark information detection, by reducing the determination threshold value for watermark information detection when the accumulation period is lengthened, thereby increasing the probability of detecting watermark information.

SPECIFIC EXAMPLE 2 OF THE WATERMARK INFORMATION ESTIMATION UNIT

Figure 35:
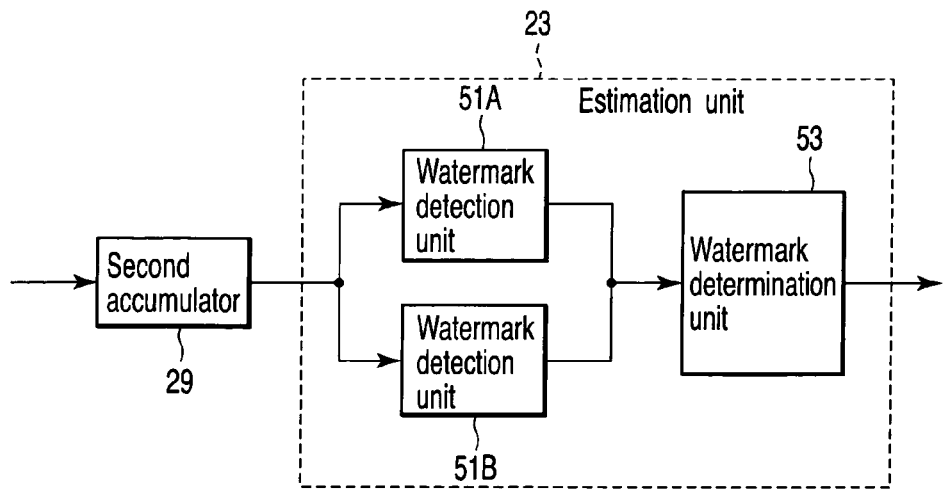
FIG. 35 is a block diagram illustrating a second specific example of an estimation unit in a digital watermark embedding apparatus according to a twelfth embodiment.

An accustomed estimation unit 23 illustrated in FIG. 35 has at least two watermark detection units 51A and 51B, which have different watermark detection methods, and a watermark determination unit 53. Each watermark detection unit 51A and 51B carries out watermark information detection independently. The watermark determination unit 42 determines whether detection results from the watermark detection units 51A and 51B are identical.

The watermark detection unit 51A receives the signal accumulated by the second accumulator 29, detects watermark information by using the first detection method, and outputs it to the watermark determination unit 53. Similarly, the watermark detection unit 51B detects watermark information by using the second detection method, and outputs it to the watermark determination unit 53. The watermark determination unit 53 compares the watermark information received from the two watermark detection units 51A and 51B with each other to determine whether they are identical. If identical, a digital watermark is determined as detected, whereby the watermark information is output directly. On the other hand, if mismatched, digital watermark is determined as not embedded, whereby information is output as "no watermark".

For example, if "A" is detected in both the first detection method carried out by the watermark detection unit 51A and the second detection method carried out by the watermark detection unit 51B, "A" will finally be detected as the watermark information since the two detection results are identical. On the other hand, if "B" is detected in the first detection method, and "C" is detected in the second detection method, digital watermark will be determined as not embedded since it is unable to estimate the final watermark information due to the difference in the two detection results. It is also possible to apply the same idea of the present embodiment in the case of three or more detection methods.

Thus, in the present embodiment, by comparing the watermark information detection results carried out by a number of detection methods, accurate detection of the watermark information can be carried out, thereby reducing probability of false detection.

(Pixel Skipping on an Input Image upon Digital Watermark Detection)

Figure 36:
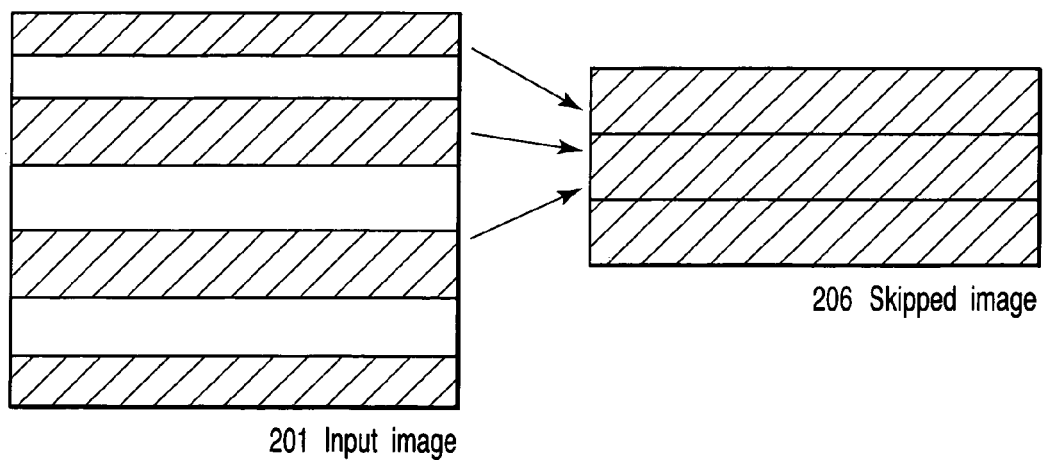
FIG. 36 illustrates a concept of a pixel skipping of an input image.

A specific example of carrying out pixel skipping on an input image in the digital watermark detection apparatus will be explained by using FIG. 36. In the example of FIG. 36, pixel skipping is carried out every other column (shaded area) of an input image signal 201, whereby a pixel skipping image signal 206 is determined as a new input image signal for the subsequent stage. By carrying out pixel skipping on the input signal 201 in this manner, it is considered that the accuracy of calculated correlation value would decline, however, it is sufficient for the detection of digital watermark and enables to reduce calculation amount effectively. The current example gives an example of carrying out pixel skipping on every other column, however, other various methods of pixel skipping can be considered, such as carrying out pixel skipping per row, carrying out pixel skipping per several columns, carrying out pixel skipping per several rows etc.

The digital watermark embedding process and digital watermark detection process based on each foregoing embodiment of the present invention can also be carried out by software using a computer. More specifically, according to the present invention, a program to enable a computer to carry out the foregoing digital watermark embedding process or digital watermark detection process can also be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark detection apparatus to detect the watermark information from an input image signal, comprising:
   a first transformation unit configured to obtain an orthogonal transformation image signal by subjecting one of an input image signal embedded with watermark information and a first accumulated signal obtained by accumulating the input image signal over a period of time to orthogonal transformation;
   a scaling unit configured to generate a scaled image signal by scaling the orthogonal transformation image signal;
   a complex addition unit configured to produce a complex addition signal by subjecting the orthogonal transformation image signal and the scaled image signal to complex addition;
   a second transformation unit configured to produce a transformation complex addition signal by subjecting the complex addition signal to orthogonal transformation or inverse orthogonal transformation; and
   an estimation unit configured to estimate the watermark information based on a peak which appears at one of the transformation complex addition signal and a second accumulated signal obtained by accumulating the transformation complex addition signal over a period.

2. A digital watermark detection apparatus according to claim 1, further comprising a signal generation unit configured to generate the second accumulated signal by normalizing an amplitude of the transformation complex addition signal and accumulating the transformation complex addition signal having the normalized amplitude.

3. A digital watermark detection apparatus according to claim 1, which further comprises a division unit configured to divide the input image signal into at least two divided signals, and wherein the scaling unit scales the input image signal for each of the divided image signals.

4. A digital watermark detection apparatus according to claim 1, which further comprises a division unit configured to divide the input image signal into at least two divided signals, and wherein the first transformation unit subjects the input image signal for each of the divided image signals to orthogonal transformation.

5. A digital watermark detection apparatus according to claim 1, wherein the estimation unit estimates the watermark information by determining a level of the peak in accordance with a threshold value changing according to an accumulation period of the second accumulated signal.

6. A digital watermark detection apparatus according to claim 1, wherein the estimation unit detects the watermark information by at least first and second detection methods, and determining the watermark information when detection results given by the first and second detection methods coincide with each other.

7. A digital watermark detection apparatus according to claim 1, wherein the estimation unit estimates the watermark information by determining a polarity of the peak.

8. A digital watermark detection apparatus according to claim 1, which further comprises a pixel skipping unit configured to carry out pixel skipping of pixels of the input image signal, and wherein the scaling unit scales an input image signal obtained by the pixel skipping.

9. A digital watermark detection apparatus according to claim 1, which further comprises a pixel skipping unit configured to carry out pixel skipping of pixels of the input image signal, and wherein the first transformation unit subjects an input image signal obtained by the pixel skipping to orthogonal transformation.

10. A digital watermark detection apparatus according to claim 1, wherein the complex addition unit carries out the complex addition by compressing amplitude of the orthogonal transformation image signal.

11. A digital watermark detection apparatus according to claim 1, which further comprises an extraction unit configured to extract a specific frequency component arranged in a pre-stage of the scaling unit or a post-stage thereof.

* * * * *